United States Patent
Lee et al.

(10) Patent No.: US 10,348,906 B2
(45) Date of Patent: *Jul. 9, 2019

(54) METHOD AND APPARATUS FOR CONTROLLING VISITOR CALL IN HOME NETWORK SYSTEM

(71) Applicant: SAMSUNG ELECTRONICS CO., LTD., Suwon-si, Gyeonggi-do (KR)

(72) Inventors: Gye-Young Lee, Seoul (KR); Hee-Dong Kim, Namyangju-si (KR); Soo-Young Lee, Suwon-si (KR); Hyun-Ki Jung, Seoul (KR); Dong-Yun Hawng, Seoul (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/174,143

(22) Filed: Oct. 29, 2018

(65) Prior Publication Data

US 2019/0068788 A1    Feb. 28, 2019

Related U.S. Application Data

(63) Continuation of application No. 15/223,983, filed on Jul. 29, 2016, now Pat. No. 10,135,990.

(30) Foreign Application Priority Data

Jul. 31, 2015  (KR) .................. 10-2015-0108503

(51) Int. Cl.
*H04W 4/00* (2018.01)
*H04M 3/54* (2006.01)
(Continued)

(52) U.S. Cl.
CPC .......... *H04M 3/54* (2013.01); *G07C 9/00309* (2013.01); *H04L 61/2514* (2013.01);
(Continued)

(58) Field of Classification Search
CPC ..... H04W 48/18; H04W 48/16; H04W 76/02; H04W 88/06; H04W 88/16;
(Continued)

(56) References Cited

U.S. PATENT DOCUMENTS 6,735,619 B1 * 5/2004 Sawada ............... H04L 12/2805
709/212
7,200,683 B1 * 4/2007 Wang ................. H04L 12/2803
709/250
(Continued)

FOREIGN PATENT DOCUMENTS

CN    102881062        1/2013
CN    102881062 A  *  1/2013
(Continued)

OTHER PUBLICATIONS

Jeong, Hyeok-Jin (kr2003-0067286—In-home outside guest identification confirmation service method and apparatus using the personal portable reader and Mobile Message (SMS, MMS, E-mail, (Pub. Date: Aug. 14, 2003), All pages and Figures.
(Continued)

*Primary Examiner* — Mahendra Patel
(74) *Attorney, Agent, or Firm* — Nixon & Vanderhye, P.C.

(57) ABSTRACT

Disclosed is a technology for a sensor network, machine to machine (M2M), machine type communication (MTC), and internet of things (IoT). The present disclosure can be used for intelligent services (for example, services related to a smart home, smart building, smart city, smart car, connected car, health care, digital education, retail business, security,
(Continued)

and safety) based on the technology. A method of controlling a visitor's call by a first terminal in a home network system includes: reading home information pre-stored in the communication module when communication with a communication module installed inside the home is possible; transmitting a visit request message including the home information and identification information of the first terminal to the smart home server or a at least on second terminal from among a plurality of second terminals; and communicating with the at least one second terminal when at least one of the plurality of second terminals accepts communication with the first terminal.

20 Claims, 18 Drawing Sheets

(51) Int. Cl.
*H04W 4/16* (2009.01)
*H04L 29/12* (2006.01)
*G07C 9/00* (2006.01)
*H04M 3/38* (2006.01)
*H04M 11/00* (2006.01)

(52) U.S. Cl.
CPC .......... *H04L 61/2567* (2013.01); *H04M 3/38* (2013.01); *H04M 11/00* (2013.01); *H04W 4/16* (2013.01); *H04M 2203/6045* (2013.01)

(58) Field of Classification Search
CPC ..... H04W 84/042; H04W 4/80; H04W 4/008; H04W 4/16; H04W 4/00; H04L 61/2015; H04L 61/6054; H04L 61/1511; H04L 2012/2841; H04L 12/2823; H04L 12/64; H04L 61/2567; H04L 61/2514; G07C 9/00309; G07C 9/00166; H04B 1/3816; H04M 2203/6045; H04M 3/54; H04M 11/00; H04M 3/38
USPC .... 455/435.2, 433, 445, 512, 404.1; 379/45, 379/211.02, 201.05; 342/457
See application file for complete search history.

(56) References Cited

U.S. PATENT DOCUMENTS

| | | | | |
|---|---|---|---|---|
| 8,255,573 | B2 * | 8/2012 | Kawamoto | H04L 12/2803 709/218 |
| 9,009,805 | B1 * | 4/2015 | Kirkby | G06K 9/00711 726/7 |
| 9,197,437 | B2 * | 11/2015 | Kim | H04L 43/50 |
| 10,133,935 | B2 * | 11/2018 | Child | G06K 9/00771 |
| 2003/0001883 | A1 * | 1/2003 | Wang | G06F 3/0481 715/736 |
| 2003/0169728 | A1 * | 9/2003 | Choi | H04L 12/2803 370/352 |
| 2003/0177271 | A1 | 9/2003 | Park | |
| 2005/0222933 | A1 * | 10/2005 | Wesby | G06Q 40/00 705/36 R |
| 2006/0063517 | A1 * | 3/2006 | Oh | H04M 3/42348 455/415 |
| 2006/0114885 | A1 | 6/2006 | Baek | |
| 2007/0216764 | A1 * | 9/2007 | Kwak | G07C 9/00309 348/14.06 |
| 2010/0029253 | A1 | 2/2010 | Han | |
| 2012/0044050 | A1 * | 2/2012 | Vig | G07C 9/00158 340/5.82 |
| 2012/0173957 | A1 * | 7/2012 | Humpleman | H04L 12/2803 715/205 |
| 2012/0330782 | A1 * | 12/2012 | Kwak | G06Q 10/08 705/26.8 |
| 2013/0031611 | A1 | 1/2013 | Barreto | |
| 2014/0337340 | A1 | 11/2014 | Yang | |
| 2015/0109104 | A1 * | 4/2015 | Fadell | G08B 27/003 340/5.65 |
| 2016/0143022 | A1 * | 5/2016 | Kim | H04W 76/10 455/415 |
| 2016/0164694 | A1 * | 6/2016 | Hyun | H04L 12/12 348/14.08 |

FOREIGN PATENT DOCUMENTS

| | | | | |
|---|---|---|---|---|
| EP | | 1806703 | 7/2007 | |
| EP | | 1806703 A2 * | 7/2007 | ......... G07C 9/00309 |
| EP | | 2860707 | 4/2015 | |
| EP | | 2860707 A1 * | 4/2015 | ......... G07C 9/00166 |
| EP | | 2757815 | 5/2015 | |
| EP | | 2757815 A4 * | 5/2015 | ............. H04L 41/22 |
| EP | | 3147872 A1 * | 3/2017 | ......... G07C 9/00166 |
| JP | | 2005-120579 | 5/2005 | |
| KR | | 20010026388 | 4/2001 | |
| KR | | 20010026388 A * | 4/2001 | |
| KR | | 10-2003-0067286 | 8/2003 | |
| KR | | 20030067286 A * | 8/2003 | |
| KR | | 20050031334 | 4/2005 | |
| KR | | 20050031334 A * | 4/2005 | |
| KR | | 10-2006-0065087 | 6/2006 | |
| KR | | 100754793 | 9/2007 | |
| KR | | 101380611 | 3/2014 | |
| KR | | 20160072386 | 6/2016 | |
| KR | | 20160135477 | 11/2016 | |
| WO | | 2005125094 | 12/2005 | |
| WO | | WO-2005125094 A1 * | 12/2005 | ............. H04W 4/02 |
| WO | | 2012138078 | 10/2012 | |
| WO | | WO-2013118978 A1 * | 8/2013 | ............. H04W 8/08 |

OTHER PUBLICATIONS

Anonymous: "Part 11: Wireless LAN Medium Access Control (MAC) and Physical Layer (PHY) Specifications—Excerpt: Association Request" In: "Part 11: Wireless LAN Medium Access Control (MAC) and Physical Layer (PHY)Specifications—Excerpt: Association Request", Mar. 29, 2012 (Mar. 29, 2012), IEEE, XP055486194, ISBN: 978-0-7381-7245-3.
David Nield: "Share Your Home Wi-Fi Easily Using an NFC Tag or QR Code", Sep. 22, 2014 (Sep. 22, 2014),pp. 1-4, XP55485575, Retrieved from the Internet: URL:https://fieldguide.gizmodo.com/share-your-home-wi-fi-easily-using-an-nfc-tag-orqr-cod-1624327128.
Search Report and Written Opinion dated Oct. 12, 2016 in counterpart International Patent Application No. PCT/KR2016/008305.
Extended European Search Report dated Jun. 27, 2018 for EP Application No. 16833255.9.

* cited by examiner

METHOD AND APPARATUS FOR CONTROLLING VISITOR CALL IN HOME NETWORK SYSTEM

CROSS-REFERENCE TO RELATED APPLICATION

This application is a continuation of U.S. application Ser. No. 15/223,983, filed on Jul. 29, 2016, which is based on and claims priority under 35 U.S.C. § 119 to Korean Application Serial No. 10-2015-0108503, which was filed in the Korean Intellectual Property Office on Jul. 31, 2015. The contents of each of these applications are incorporated by reference herein in their entirety.

TECHNICAL FIELD

The present disclosure relates to a method and an apparatus for controlling a visitor call in a home network system.

BACKGROUND

The Internet is evolving from a human-oriented connection network in which humans generate and consume information, to the internet of things (IoT) network in which distributed elements, such as things and the like, exchange and process information. internet of everything (IoE) technology may be an example of a combination of the IoT technology and big data processing technology through a connection with a cloud server.

In order to implement the IoT, technical factors such as a sensing technique, a wired/wireless communication and network infrastructure, a service interface technology, and a security technology are required, and thus, recently, technologies such as a sensor network, machine to machine (M2M), machine type communication (MTC), and the like for a connection between objects are being researched.

In an IoT environment, through collection and analysis of data generated in connected objects, an intelligent internet technology (IT) service to create a new value for people's life may be provided. The IoT may be applied to fields, such as a smart home, smart building, smart city, smart car, connected car, smart grid, health care, smart home appliance, or high-tech medical service, through the convergence and combination of the conventional information technology (IT) and various industries.

In general, in a home network system, an interphone is a device for confirming an identity of a visitor. When the interphone is installed inside a home and the doorphone is installed outside the home in the home network system, if a visitor presses the doorphone, a camera of the doorphone photographs a visitor's image and outputs the image to the interphone inside the home. Accordingly, a resident within the home may confirm a visitor's identity through the image output to the interphone.

However, when the interphone is used in the home network, if there is no resident within the home, it is not possible to confirm the visitor's identity and the visitor cannot enter the home. Accordingly, in the home network system, a method by which the resident can confirm the visitor's identity regardless of whether the resident is located within the home is needed.

Further, constructing a communication system between the doorphone outside the home and the interphone inside the home additionally costs much. In order to solve the problem, a method of confirming the visitor's identity without the installation of the doorphone outside the home and the interphone inside the home in the home network system is required.

SUMMARY

An example embodiment of the present disclosure provides a method and an apparatus for controlling a visitor's call in a home network system.

An example embodiment of the present disclosure provides a method and an apparatus for controlling a visitor's call that pages a terminal of a resident through a terminal of the visitor in the home network system.

An example embodiment of the present disclosure provides a method and an apparatus for controlling a visitor's call that pages the terminal of the resident through a communication module installed outside the home in the home network system.

An example embodiment of the present disclosure provides a method and an apparatus for controlling a visitor's call that pages the terminal of the resident regardless of a location of the resident in the home network system.

In accordance with an example aspect of the present disclosure, a method of controlling a visitor's call by a first terminal in a home network system is provided. The method includes: reading home information pre-stored in a communication module when communication with the communication module installed inside the home is possible; transmitting a visit request message including the home information and identification information of the first terminal to a smart home server or at least one second terminal among a plurality of second terminals; and communicating with the at least one second terminal when at least one of the plurality of second terminals accepts communication with the first terminal.

In accordance with another example aspect of the present disclosure, a method of controlling a visitor's call by a smart home server in a home network system is provided. The method includes: receiving a visit request message including home information and identification information of the first terminal from the first terminal; and transmitting a call message to one of a plurality of second terminals included in a household corresponding to the home information.

In accordance with another example aspect of the present disclosure, a method of controlling a visitor's call by a second terminal in a home network system is provided. The method includes: receiving a call message from a smart home server or a gateway existing inside the home; transmitting a call response message including information indicating whether to communicate with a first terminal of a visitor; and performing communication with the first terminal when the information indicating whether to communicate with the first terminal of the visitor corresponds to positive information.

In accordance with another example aspect of the present disclosure, a method of controlling a visitor's call by a gateway existing inside the home in a home network system is provided. The method includes: receiving a call message from a smart home server or a first terminal of a visitor; transferring the call message to at least one of a plurality of second terminals included in a household; and performing communication with the first terminal and relaying the communication to the at least one second terminal.

In accordance with another example aspect of the present disclosure, an apparatus for controlling a visitor's call by a first terminal in a home network system is provided. The apparatus includes: a controller configured to read home information pre-stored in a communication module comprising communication circuitry, when communication with the communication module installed outside the home is possible, to read home information pre-stored in the communication module, to control a transmitter to transmit a visit request message including the home information and identification information of the first terminal to a smart home server or at least one second terminal among a plurality of second terminals, and to communicate with the at least one second terminal when at least one of the plurality of second terminals accepts communication with the first terminal; and the transmitter configured to transmit the visit request message to the smart home server or the at least one second terminal.

In accordance with another example aspect of the present disclosure, an apparatus for controlling a visitor's call by a smart home server in a home network system is provided. The apparatus includes: a receiver configured to receive a visit request message including home information and identification information of the first terminal from the first terminal; a controller configured to determine at least one second terminal to transmit a call message from among a plurality of second terminals included in a household corresponding to the home information; and a transmitter configured to transmit the call message to the at least one determined second terminal.

In accordance with another example aspect of the present disclosure, an apparatus for controlling a visitor's call by a second terminal in a home network system is provided. The apparatus includes: a receiver configured to receive a call message from a smart home server or a gateway existing inside the home; a transmitter configured to transmit a call response message including information indicating whether to perform communication with a first terminal of the visitor; and a controller configured to control the apparatus to communicate with the first terminal, when the information indicating whether to communicate with the first terminal of the visitor corresponds to positive information.

In accordance with another example aspect of the present disclosure, an apparatus for controlling a visitor's call by a gateway existing inside the home in a home network system is provided. The apparatus includes: a receiver configured to receive a call message from a smart home server or a first terminal of a visitor; a transmitter configured to transfer the call message to at least one of a plurality of second terminals included in a household; and a controller configured to communicate with the first terminal and to cause a relay of the communication to the at least one terminal.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein.

DETAILED DESCRIPTION

Hereinafter, example embodiments of the present disclosure will be described in greater detail with reference to the accompanying drawings. In the following description, it should be noted that only portions required for comprehension of operations according to the example embodiments of the present disclosure will be described and descriptions of other portions may be omitted to avoid obscuring subject matters of the present disclosure.

The present disclosure provides a method and an apparatus for controlling a visitor's call that allow a communication service such as a wireless call, a text chatting, and an image storage service during an absence between a visitor and a resident by paging, by a terminal of the visitor, a terminal of the resident, or the like, regardless of a location of the resident through a communication module installed outside the home in a home network system. Further, another example aspect of the present disclosure is to provide a method and an apparatus for controlling a visitor's call which allows direct communication between the terminal of the visitor and a gateway existing within the home through a communication module installed outside the home.

To this end, a method and an apparatus for controlling a visitor's call in a home network system according to an example embodiment of the present disclosure will be described in greater detail below.

Figure 1:
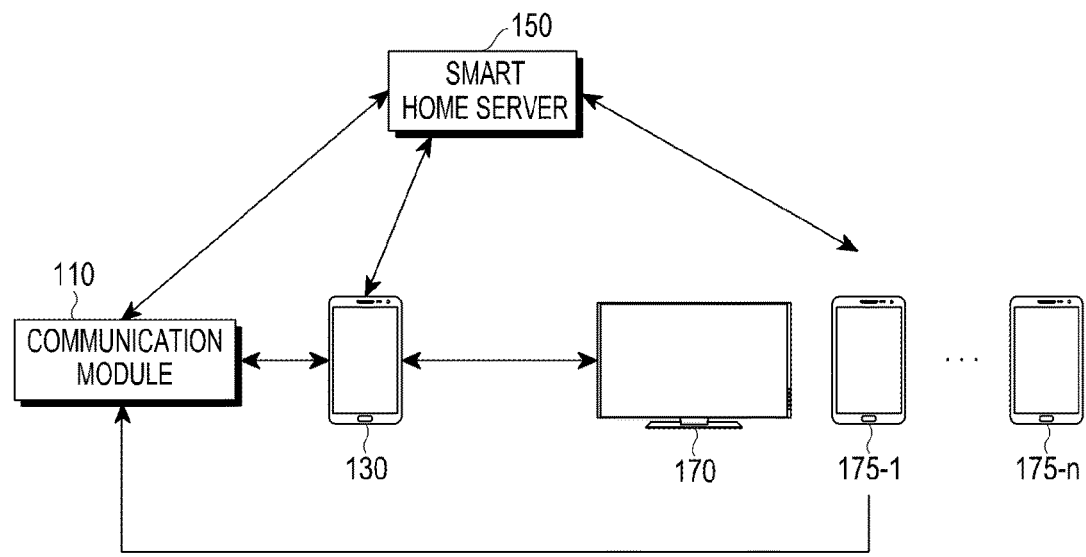
FIG. 1 is a diagram illustrating an example home network system according to an example embodiment of the present disclosure.

FIG. 1 is a diagram illustrating an example home network system according to an example embodiment of the present disclosure.

Referring to FIG. 1, the home network system according to the example embodiment of the present disclosure includes a communication module (e.g., including communication circuitry) 110, a first terminal 130, a smart home server 150, a gateway 170, and a plurality of second terminals 175-1, . . . , and 175-n. The communication module 110 may include various communication circuitry, including, but not limited to at least one of a near field communication (NFC) module which can perform both reading and writing and a device that supports a quick response (QR) code and bluetooth low energy (BLE), and is installed onto a front door or a wall outside the home. For example, the communication module 110 may include a memory that stores home information assigned from the smart home server 150 by a request of at least one second terminal among the plurality of second terminals 175-1, . . . , and 175-n. For example, the home information may include a home ID in the form of uniform resource locator (URL). A method by which the communication module 110 stores the home information assigned from the smart home server 150 by the request of at least one second terminal among the plurality of second terminals 175-1, . . . , and 175-n will be described in greater detail below with reference to FIG. 2.

The first terminal 130 is a terminal that makes a request for visiting home by a visitor and, when the first terminal 130 is located within a predetermined distance in which communication with the communication module 110 is possible, the first terminal 130 reads home information pre-stored in the communication module 110, inserts the home information into a home visit request message, and transfers the home visit request message to the smart home server 150 or the gateway 170. A case where the first terminal 130 transfers the home visit request message to the smart home server 150 corresponds to a case where the communication module 110 includes, for example, an NFC module or a QR code, and a case where the first terminal 130 transfers the home visit request message to the gateway 170 corresponds to a case where the communication module 110 includes, for example, a device that supports BLE. Further, the home visit request message may include at least one of the home information pre-stored in the communication module 110 and identification information for identifying the first terminal 130, and the identification information may include, for example, at least one of a phone number of the first terminal 130 and a visitor's fingerprint.

When at least one of the plurality of second terminals (plurality of second terminals 175-1, . . . , and 175-n) accepts communication with the first terminal 130 under control of the smart home server 150, the first terminal 130 may communicate with the second terminal that accepts the communication.

The smart home server 150 corresponds, for example, to a server that manages and controls general home automation in the home network system. When the smart home server 150 receives a home information request message that makes a request for generating or changing home information from one second terminal (for example, second terminal 175-1) among the plurality of second terminals 175-1, . . . , and 175-n, the smart home server 150 assigns home information to the second terminal 175-1. When the smart home server 150 receives the home visit request message from the first terminal 130, the smart home server 150 decodes the home information included in the home visit request message and pages the gateway 170 or at least one of the plurality of second terminals 175-1, . . . , and 175-n included in the household corresponding to the decoded home information according to an example embodiment of the present disclosure.

The smart home server 150 may page the gateway 170 or each of the second terminals 175-1, . . . , and 175-n set to the household, or page the corresponding gateway 170 and at least one second terminal according to a preset terminal call order. The terminal call order may be set by at least one of user settings, time, and a location of the second terminal corresponding to the phone device among the gateway 170 and the second terminals 175-1, . . . , and 175-n set to the household. For example, the terminal call order may be set such that the gateway 170 and the second terminal (for example, second terminal 175-1) are paged when the second terminal (for example, second terminal 175-1) corresponding to the phone device is located within a predetermined distance from the home, and only the second terminal (for example, second terminal 175-1) is paged when the second terminal is not located within the predetermined distance. In another example, the terminal call order may be set such that a mother's phone device is paged first, a father's phone device is paged second, and a child's phone device is paged third according to a family relationship. In another example, the terminal call order may be set such that another second terminal is paged according to time. In another example, the terminal call order may be set such that, when an absence function is activated in a particular second terminal according to the user settings, the particular second terminal is skipped in the call order and another second terminal is paged.

The plurality of second terminals 175-1, . . . , and 175-n correspond to terminals preset to the household to identify visiting of visitors, and may be phone devices of residents within the home and home appliances installed within the home. Further, each of the plurality of second terminals 175-1, . . . , and 175-n may receive a home call message from the smart home server 150 and communicate with the first terminal 130.

The gateway 170 corresponds to terminals preset to the household to identify visiting of visitors and may perform the same operation as that the plurality of second terminals 175-1, . . . , and 175-n. For example, the gateway 170 simultaneously operates in an AP mode and a station mode. For example, the gateway 170 may be Wi-Fi connected with the plurality of second terminals 175-1, . . . , and 175-n included within the home while operating in a state where the gateway 170 is connected to the AP within the home. Hereinafter, a mode in which the gateway 170 operates in the AP mode and the station mode at the same time may be referred to, for example, as a concurrent mode. For example, after receiving the home call message from the smart home server 150 or the first terminal 130, the gateway 170 may transfer the home call message to at least one of the plurality of second terminals 175-1, . . . , and 175-n. The gateway 170 should receive a public IP address and port of each of the plurality of second terminals 175-1, . . . , and 175-n from each of the plurality of second terminals 175-1, . . . , and 175-n when a communication service starts or whenever an IP address of the gateway 170 changes. Hereinafter, methods of controlling a visitor's call in the home network system will be described according to various example embodiments of the present disclosure.

Figure 2:
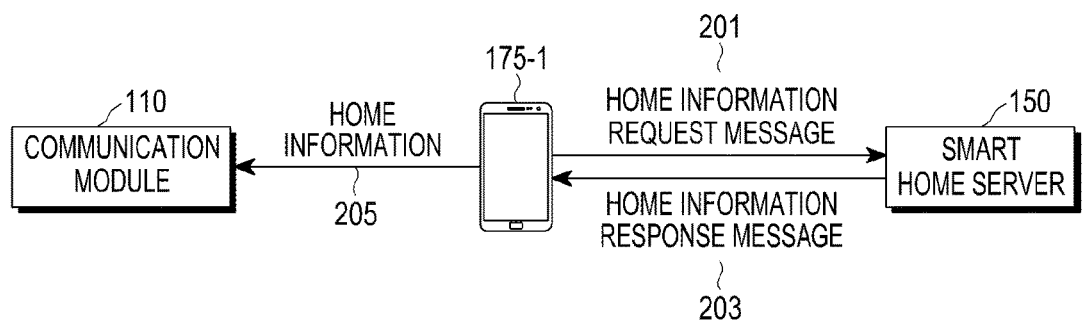
FIG. 2 is a diagram illustrating an example of a method of storing home information in a communication module in the home network according to an example embodiment of the present disclosure.

In order to perform a method of controlling a visitor's call in the home network system according to example embodiments of the present disclosure, home information should be first stored in the communication module 110 by at least one second terminal 175-1 as illustrated, for example, in FIG. 2.

FIG. 2 is a diagram illustrating an example of a method of storing home information in the communication module 110 in the home network according to an example embodiment of the present disclosure.

Referring to FIG. 2, the second terminal 175-1 transmits a home information request message 201 that makes a request for generating or changing the home information to the smart home server 150. When the home information includes a home ID in a URL form, the home information request message may include, for example, URL: http://samsung.smarthome.com/request/id?userid".

When the smart home server 150 receives the home information request message 201 from the second terminal 175-1, the smart home server 150 generates and encodes home information on the household including the second terminal 175-1, inserts the encoded home information into a home information response message 203, and then transmits the home information response message 203 to the second terminal 175-1.

Further, the second terminal 175-1 decodes the home information response message 203, identifies home information included in the home information response message, and stores the identified home information in the communication module 110 as indicated by reference numeral 205. The home information may include, for example, at least one of a server ID having transmitted the home information and a home ID for identifying the home including the second terminal 175-1. For example, the identified home information corresponds to a visitor server page address such as "URL: http://samsung.smarthome.com/request/id?abcd" and may include a server ID and a home ID in a URL form.

As described above, through the method of storing the home information in the communication module 110 according to the example embodiment of the present disclosure, the second terminal 175-1 may change the home information stored in the communication module 110 periodically or based on user settings. According to an example embodiment of the present disclosure, the resident can maintain security from the visitor's visiting.

Figure 3:
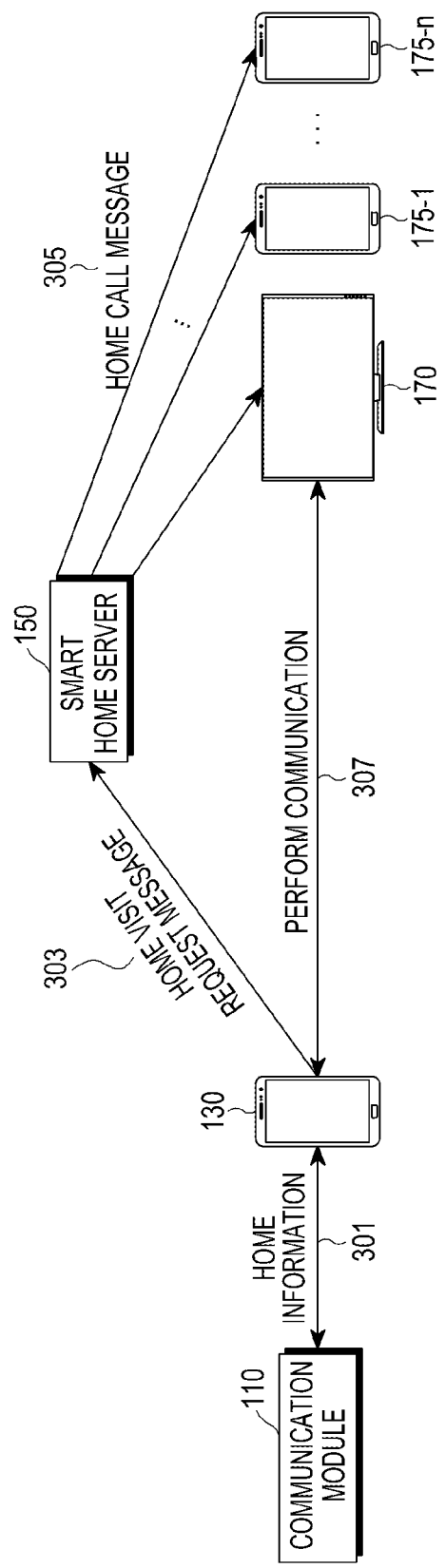
FIG. 3 is a diagram illustrating an example method of controlling a visitor's call in the home network according to a first example embodiment of the present disclosure.

FIG. 3 is a diagram illustrating an example method of controlling a visitor's call in the home network according to a first example embodiment of the present disclosure. The first example embodiment of the present disclosure relates to a method of controlling a visitor's call when the first terminal 130 reads an NFC module or a QR code through the communication module 110. Further, the example first embodiment of the present disclosure relates to a method by which the smart home server 150 directly pages the gateway 170 set to the household and at least one of the plurality of second terminals 175-1, . . . , and 175-n.

Referring to FIG. 3, when the first terminal 130 reads the NFC module or the QR code of the communication module 110 within a predetermined distance for communication with the communication module 110, the first terminal 130 transmits pre-stored home information (for example, URL: http://samsung.smarthome.com/request/id?abcd) to the first terminal 130 as indicated by reference numeral 301. Further, the first terminal 130 transmits a home visit request message including the home information and identification information of the first terminal 130 to the smart home server 150 as indicated by reference numeral 303. Then, the smart home server 150 decodes home information included in the home visit request message and transmits a home call message to at least one second terminal among the gateway 170 and the plurality of second terminals 175-1, . . . , and 175-n included in the household corresponding to the decoded home information as indicated by reference numeral 305 according to a preset terminal call order. The home call message may include, for example, identification information for identifying the first terminal 130 included in the home visit request message. Thereafter, when at least one of the gateway 170 and at least one second terminal that received the home call message accept communication, the first terminal 130 communicates with the device having accepted the communication as indicated by reference numeral 307. An example in which the first terminal 130 and the second terminal communicate with each other according to the first example embodiment of the present disclosure will be described in greater detail below with reference to FIGS. 11A and 11B.

Figure 4:
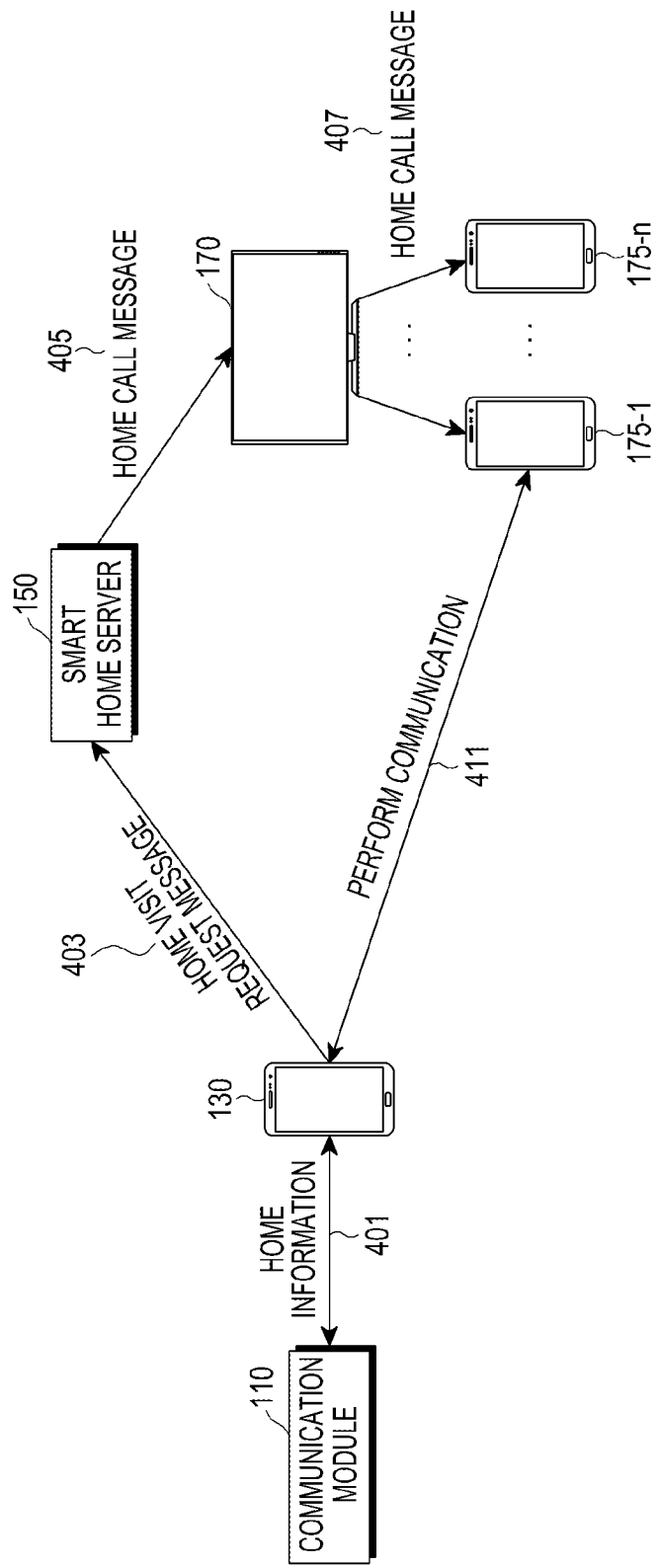
FIG. 4 is a diagram illustrating an example method of controlling a visitor's call in the home network according to a second example embodiment of the present disclosure.

FIG. 4 is a diagram illustrating an example method of controlling a visitor's call in the home network according to a second example embodiment of the present disclosure. The example second embodiment of the present disclosure relates to a method of controlling a visitor's call when the first terminal 130 reads an NFC module or a QR code through the communication module 110. Further, the example second embodiment of the present disclosure relates to a case where the first terminal 130 pages at least one second terminal through the gateway 170 within the home.

Referring to FIG. 4, when the first terminal 130 reads the NFC module or the QR code of the communication module 110 within a predetermined distance for communication with the communication module 110, the communication module 110 transmits pre-stored home information (for example, URL: http://samsung.smarthome.com/request/id-?abcd) to the first terminal 130 as indicated by reference numeral 401. Further, the first terminal 130 transmits a home visit request message including the home information and identification information of the first terminal 130 to the smart home server 150 as indicated by reference numeral 403. The smart home server 150 decodes home information included in the home visit request message and transmits a home call message to the gateway 170 of the household corresponding to the decoded home information as indicated by reference numeral 405. Then, the gateway 170 transfers the received home call message to at least one of the plurality of second terminals 175-1, . . . , and 175-n according to a preset terminal call order as indicated by reference numeral 407. Thereafter, when at least one second terminal having received the home call message accepts the communication, the first terminal 130 communicates with the second terminal having accepted the communication as indicated by reference numeral 411. An example in which the first terminal 130 and the second terminal communicate with each other according to the example second embodiment of the present disclosure will be described in greater detail below with reference to FIGS. 12A and 12B.

Figure 5:
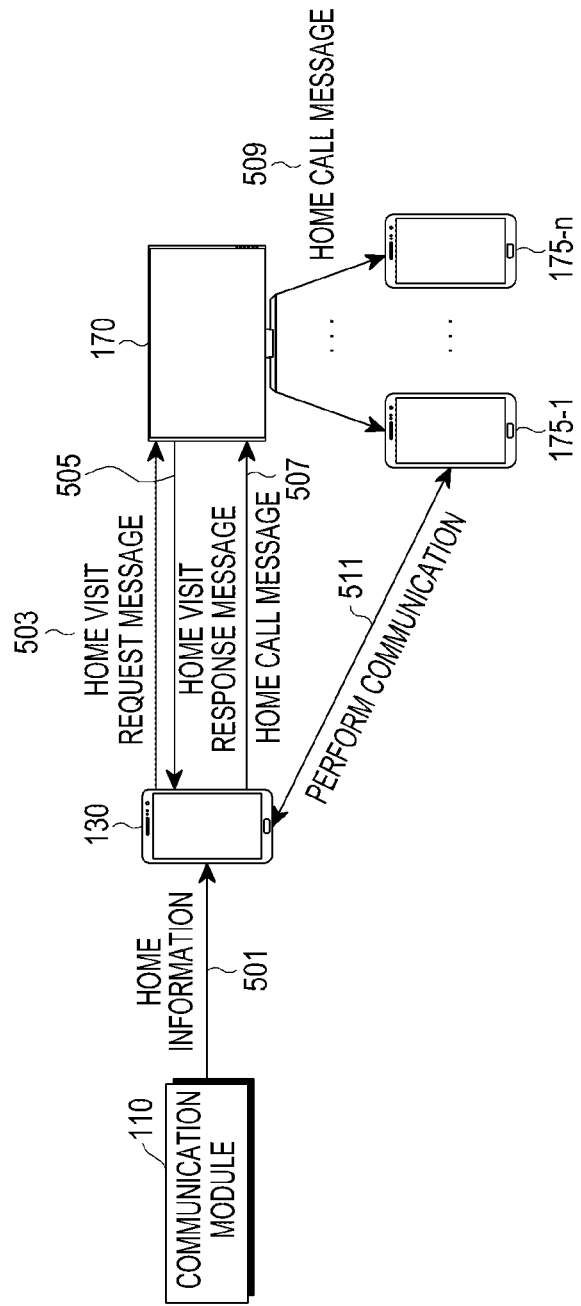
FIG. 5 is a diagram illustrating an example method of controlling a visitor's call in the home network according to a third example embodiment of the present disclosure.

FIG. 5 is a diagram illustrating an example method of controlling a visitor's call in the home network according to a third example embodiment of the present disclosure. The third example embodiment of the present disclosure relates to a method of controlling a visitor's call when the first terminal 130 performs BLE communication with at least one second terminal through the communication module 110. Further, the third example embodiment of the present disclosure relates to a case where the first terminal 130 pages at least one second terminal through the gateway 170 within the home.

Referring to FIG. 5, when the first terminal 130 is set to perform BLE communication with the communication module 110 based on user settings, the communication module 110 transmits pre-stored home information to the first terminal 130 as indicated by reference numeral 501. Then, the first terminal 130 transmits a home visit request message including identification information of the first terminal 130 to the gateway 170 included within the home through the BLE communication as indicated by reference numeral 503.

When receiving the home visit request message, the gateway 170 starts to operate in a concurrent mode and transmits a home visit response message including AP information (for example, service set identifier (SSID) and password) for performing an AP mode to the first terminal 130 as indicated by reference numeral 505. The first terminal 130 identifies the received AP information and transmits a home call message that makes a request for communication with at least one of the plurality of second terminals 175-1, ... , and 175-n to the gateway 170 as indicated by reference numeral 507. Then, the gateway 170 transfers the home call message to at least one of the plurality of second terminals 175-1, ... , and 175-n according to a preset terminal call order as indicated by reference numeral 509. Thereafter, when at least one second terminal having received the home call message accepts the communication, the first terminal 130 communicates with the second terminal having accepted the communication as indicated by reference numeral 511. An example in which the first terminal 130 and the second terminal communicate with each other according to the third example embodiment of the present disclosure will be described in greater detail below with reference to FIGS. 13A and 13B.

Figure 6:
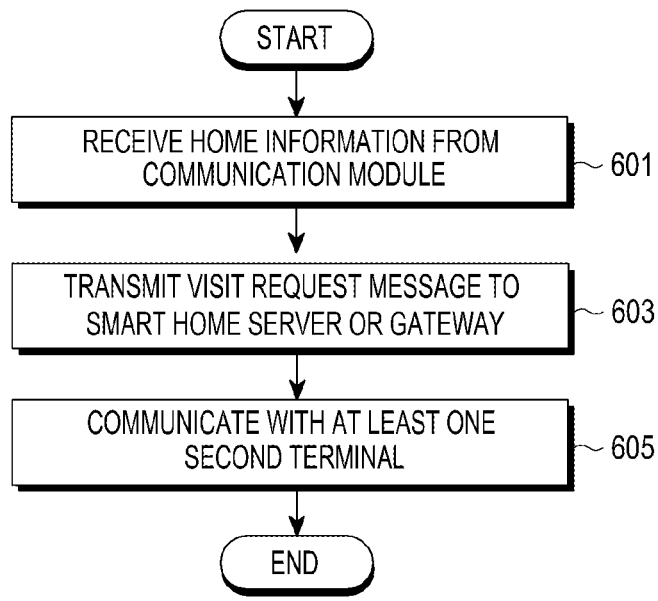
FIG. 6 is a flowchart illustrating an example method by which a first terminal of the home network system controls a visitor's call according to example embodiments of the present disclosure.

FIG. 6 is a flowchart illustrating an example method by which the first terminal 130 of the home network system controls a visitor's call according to example embodiments of the present disclosure.

Referring to FIG. 6, when the first terminal 130 reads the NFC module or the QR code of the communication module 110 or performs BLE communication with the communication module 110 within a predetermined distance for communication with the communication module 110 according to a user's selection, the first terminal 130 receives home information from the communication module 110 in step 601. The first terminal 130 transmits a home visit request message including at least one piece of the home information and identification information of the first terminal 130 to the smart home server 150 or the gateway 170 through BLE communication in step 603. Thereafter, the first terminal 130 communicates with at least one second terminal having accepted the communication among at least one second terminal having received the home call request message from the smart home server 150 or the gateway 170 in step 605.

Figure 7:
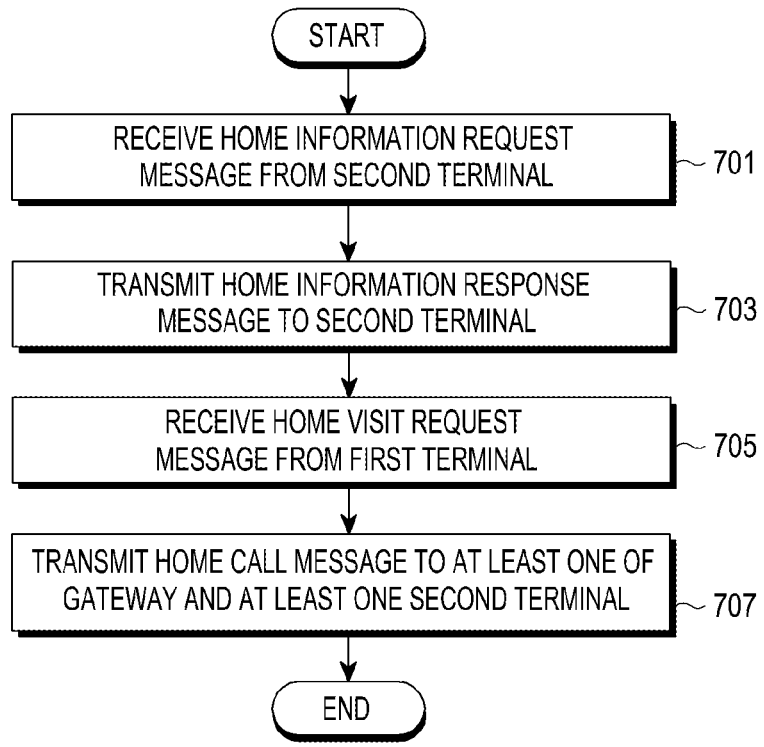
FIG. 7 is a flowchart illustrating an example method by which a smart home server of the home network system controls a visitor's call according to example embodiments of the present disclosure.

FIG. 7 is a flowchart illustrating an example method by which the smart home server 150 of the home network system controls a visitor's call according to example embodiments of the present disclosure.

Referring to FIG. 7, the smart home server 150 receives a home information request message that makes a request for generating or changing home information from at least one of the plurality of second terminals 175-1, ... , and 175-n in step 701. Then, the smart home server 150 generates home information on the household of the second terminal having transmitted the home information request message and transmits the home information response message including the generated home information to the second terminal in step 703.

Thereafter, the smart home server 150 receives a home visit request message including at least one piece of home information and identification information from the first terminal 130 in step 705. Further, the smart home server 150 decodes the received home visit request message, receives home information, and transmits a home call message to at least one of the plurality of second terminals 175-1, ... , and 175-n included in the household corresponding to the home information in step 707. At this time, the smart home server 150 may transmit the home call message to the gateway 170 and each of all the second terminals 175-1, ... , and 175-n included within the home or transmit the home call message only to at least one of the corresponding gateway 170 and at least one second terminal according to a preset terminal call order.

Steps 701 to 703 may be performed when the smart home server 150 receives the home information request message from one of the plurality of second terminals 175-, ... , and 175-n. For example, when there are records of generation and assignment of home information on the second terminal, the smart home server 150 may perform steps 705 and 707 without steps 701 and 703.

Figure 8:
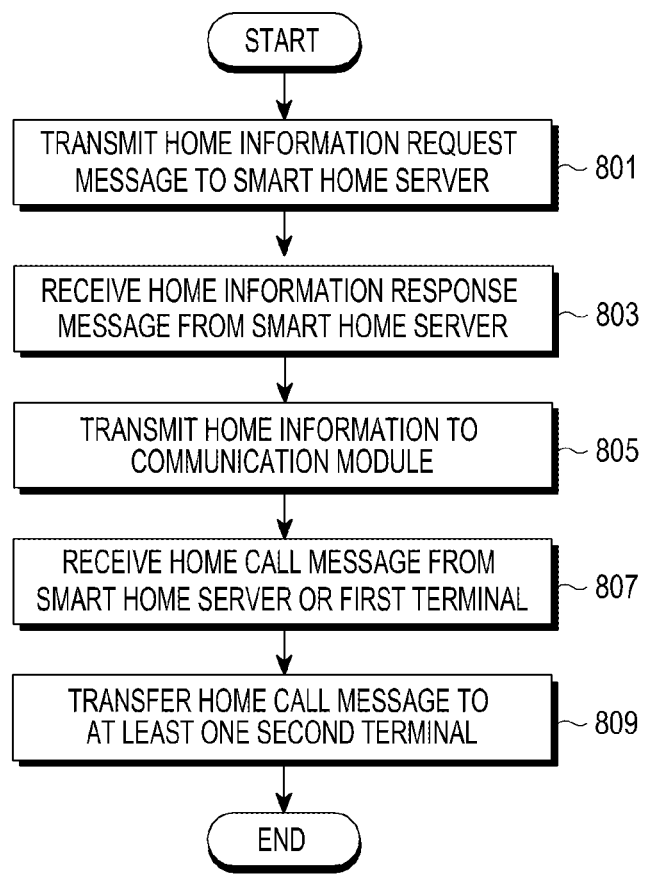
FIG. 8 is a flowchart illustrating an example method by which a gateway of the home network system controls a visitor's call according to example embodiments of the present disclosure.

FIG. 8 is a flowchart illustrating an example method by which the gateway of the home network system controls a visitor's call according to example embodiments of the present disclosure. The gateway 170 simultaneously operates in an AP mode and a station mode according to an example embodiment of the present disclosure. For example, the gateway 170 may be connected to the plurality of second terminals 175-1, ... , and 175-n included within the home while operating in a state where the gateway 170 is connected to an AP within the home.

Referring to FIG. 8, the gateway 170 transmits a home information request message that makes a request for generating or changing home information to the smart home server 150 in step 801. The gateway 170 receives the home information response message including home information from the smart home server 150 in step 803. The gateway 170 transmits home information included in the home information request message to the communication module 110 in step 805. Steps 801 to 805 may be performed on every period according to the user settings. Steps 801 to 805 may not be performed by the gateway 170 when steps 801 to 805 have been already performed by one of the plurality of second terminals 175-1, ... , and 175-n.

Thereafter, when receiving a home call message from the smart home server 150 or the first terminal 130 in step 807, the gateway 170 transfers the received home call message to at least one of the plurality of second terminals 175-1, ... , and 175-n in step 809.

Figure 9:
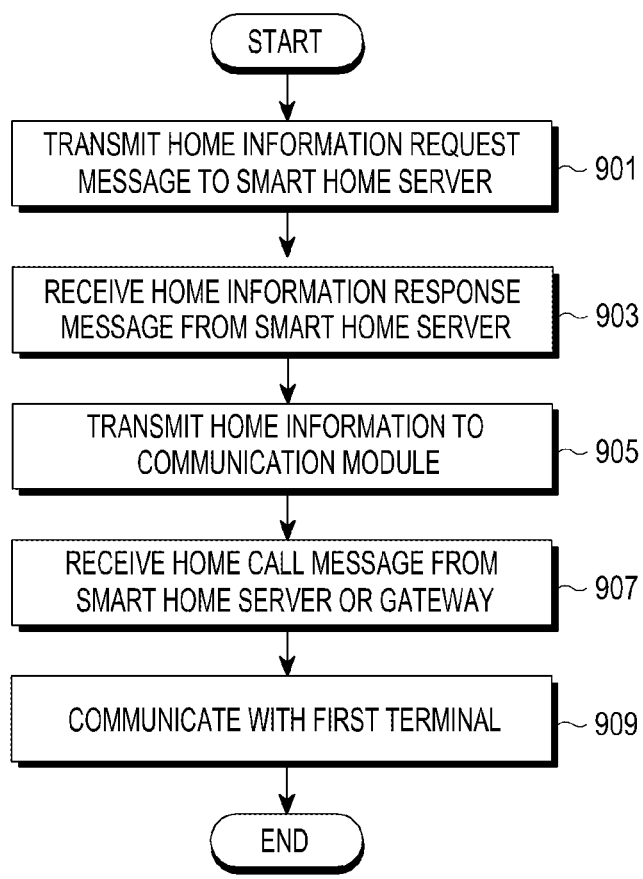
FIG. 9 is a flowchart illustrating an example method by which at least one of a plurality of second terminals of the home network system controls a visitor's call according to example embodiments of the present disclosure.

FIG. 9 is a flowchart illustrating an example method by which one of a plurality of second terminals of the home network system controls a visitor's call according to example embodiments of the present disclosure.

Referring to FIG. 9, the second terminal transmits a home information request message that makes a request for generating or changing home information to the smart home server 150 in step 901. The second terminal receives the home information response message including home information from the smart home server 150 in step 903. The second terminal transmits home information included in the home information request message to the communication module 110 in step 905. Steps 901 to 905 may be performed on every period according to the user settings. Steps 901 to 905 may not be performed by the second terminal when steps 901 to 905 have been already performed by the gateway 170.

Thereafter, when receiving a home call message from the smart home server 150 or the gateway 170 in step 907, the second terminal may accept communication with the first terminal 130 and communicate with the first terminal 130 in step 909.

Figure 10:
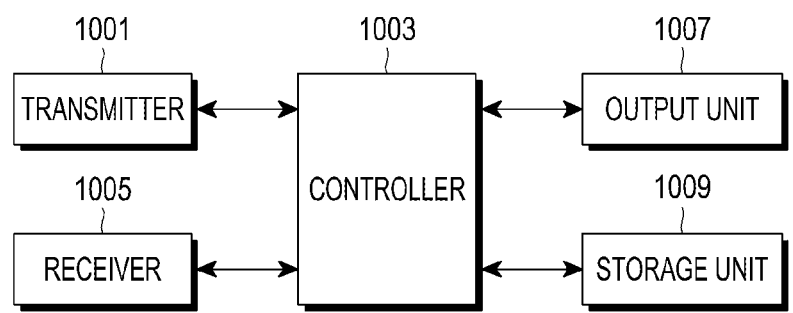
FIG. 10 is a block diagram illustrating an example device for controlling a visitor's call in each entity included in the home network system according to an example embodiment of the present disclosure.

FIG. 10 is a block diagram illustrating an example device for controlling a visitor's call in each entity included in the home network system according to an example embodiment of the present disclosure. The entity included in the home network system according to an example embodiment of the present disclosure may refer, for example, to the first terminal 130, the smart home server 150, the gateway 170, and each of the plurality of second terminals 175-1, . . . , and 175-n, respectively.

Referring to FIG. 10, each entity included in the home network system includes a transmitter 1001, a controller 1003, a receiver 1005, an output unit (e.g., including storage circuitry) 1007, and a storage unit 1009.

First, the controller 1003 is configured to control the general operation of each entity and, for example, controls the operation related to the operation for controlling a visitor's call in the home network system according to an example embodiment of the present disclosure. Since the operation for controlling the visitor's call in the home network system according to an example embodiment of the present disclosure is the same as that described in FIGS. 2 to 9, a repeated detailed description thereof will be omitted herein.

The transmitter 1001 is configured to transmit various signals and various messages to different entities included in the home network system under control of the controller 1003. Since the various signals and the various messages transmitted by the transmitter 1003 are the same as those described in FIGS. 2 to 9, a repeated detailed description thereof will be omitted herein.

Further, the receiver 1005 receives various signals and various messages from different entities included in the home network system under control of the controller 1003. Since the various signals and the various messages received by the receiver 1005 are the same as those described in FIGS. 2 to 9, a repeated detailed description thereof will be omitted herein.

The output unit 1007 stores programs and various pieces of information related to the operation for controlling the visitor's call in the home network system according to an example embodiment of the present disclosure under control of the controller 1003.

Further, the output unit 1007 stores the various signals and various messages which the receiver 1005 receives from the different entities.

The storage unit 1009 outputs various signals and various messages related to the operation for controlling the visitor's call in the home network system according to an example embodiment of the present disclosure under control of the controller 1003. Since the various signals and various messages output by the storage unit 1009 are the same as those described in FIGS. 2 to 9, a repeated detailed description thereof will be omitted herein.

Meanwhile, although FIG. 10 illustrates a case where the entities are implemented as separated unit such as the transmitter 1001, the controller 1003, the receiver 1005, the output unit 1007, and the storage unit 1009, each entity can be implemented in a combination of at least two of the transmitter 1001, the controller 1003, the receiver 1005, the output unit 1007, and the storage unit 1009. Further, each entity can be implemented as one processor.

Hereinafter, a method of performing communication between the first terminal 130 and the second terminal will be described according to example embodiments of the present disclosure. In various example embodiments of the present disclosure, the communication between the first terminal 130 and the second terminal may be performed using a network address translation (NAT) technology. In the NAT technology, for the communication between the first terminal 130 and the second terminal, the second terminal looks up a public IP of the first terminal through an NAT server or, when there is no NAT function in a router, the NAT server performs a packet relay function. For example, in the NAT technology, the NAT server registers the IP address of the first terminal 130, issues a Nat ID corresponding to the registered IP address, and transmits the Nat ID to the second terminal. Further, the second terminal starts communication with the first terminal 130 after looking up the Nat ID through the NAT server and identifying the IP address of the first terminal 130.

When the NAT technology is applied to example embodiments of the present disclosure, communication may be performed between the first terminal 130 and the second terminal as illustrated in FIGS. 11A to 13B below. Hereinafter, FIGS. 11A to 13B illustrate only one second terminal 175-1 for convenience of the description, and it is assumed that the second terminal 175-1 currently exists outside the home. Example embodiments of the present disclosure can be equally applied to all home network systems in which at least one second terminal exists. Further, in example embodiments of FIGS. 11A to 13B, it is assumed that home information has been already stored in the communication module 110.

Figure 11A:
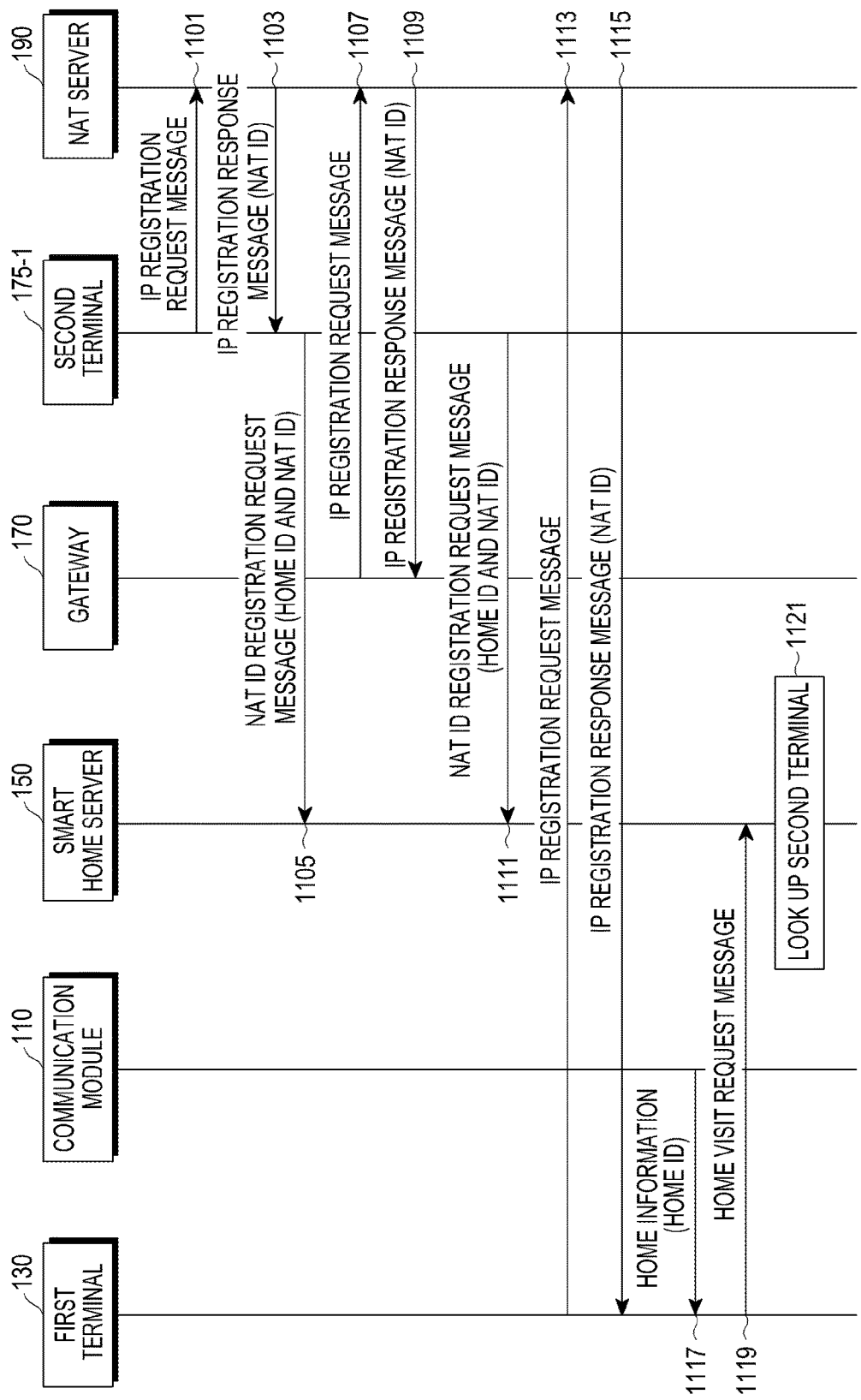
FIGS. 11A and 11B are flow diagrams illustrating an example of controlling a visitor's call by applying an NAT technology in the home network according to a first example embodiment of the present disclosure.
Figure 11B:
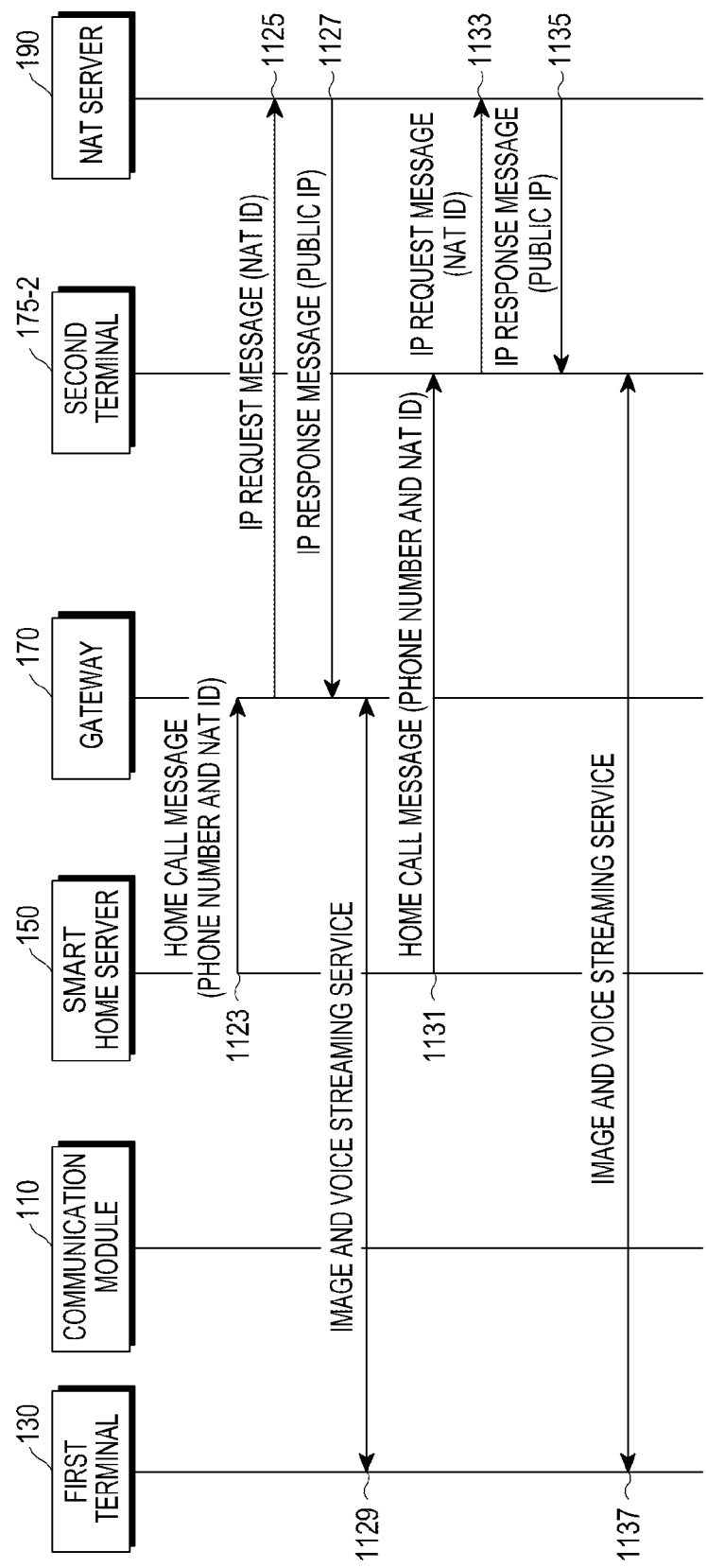

FIGS. 11A and 11B are flow diagrams illustrating an example in which the home network controls a visitor's call by applying the NAT technology according to a first example embodiment of the present disclosure.

Referring to FIGS. 11A and 11B, the second terminal 175-1 transits an IP registration request message to the NAT server 190 in step 1101. The IP registration request message may include an IP address of the second terminal 175-1. Then, the NAT server 190 receives the IP registration request message from the second terminal 175-1, registers the IP address included in the IP registration request message, inserts a Nat ID of the IP address of the second terminal 175-1 into an IP registration response message, and transmits the IP registration response message to the second terminal 175-1 in step 1103. Further, the second terminal 175-1 transmits a Nat ID registration request message including a home ID of the second terminal 175-1 and the Nat ID to the smart home server 150 in step 1105. The smart home server 150 may identify the household corresponding to the home ID and store the Nat ID of the second terminal 175-1 in a management list of the household.

A process for requesting and registering the Nat ID is performed between each of all the second terminals 175-1, . . . , and 175-n and the gateway 170 included in the household and the NAT server 190 and the smart home server 150. For example, the gateway 170 also transmits the IP registration request message including an IP address of the gateway 170 to the NAT server 190 like the second terminal 175-1 in step 1107. Then, the NAT server 190 receives the IP registration request message from the gateway 170, registers the IP address included in the IP registration request message, inserts a Nat ID of the IP address of the gateway 170 into an IP registration response message, and transmits the IP registration response message to the gateway 170 in step 1109. Further, the gateway 170 transmits a Nat ID registration request message including a home ID of the gateway 170 and the Nat ID to the smart home server 150 in step 1111. The smart home server 150 may identify the household corresponding to the home ID and store the Nat ID of the gateway 170 in a management list of the household.

When the first terminal 130 carried by the visitor receives a Nat ID from the NAT server 190, the first terminal 130 may perform communication using the NAT technology between the first terminal 130 and at least one of the gateway 170 and at least one second terminal. Accordingly, the first terminal 130 transmits the IP registration request message including the IP address of the first terminal 130 to the NAT server 190 in step 1113. Further, the first terminal 130 receives an IP registration response message including the Nat ID from the NAT server 190 in step 1115.

Thereafter, when the first terminal 130 is located within a predetermined distance for communication with the communication module 110, the first terminal 130 receives home information (for example, home ID) from the communication module 110 in step 1117.

Further, the first terminal 130 transmits a home visit request message including the home ID and identification information of the first terminal 130 to the smart home server 150 in step 1119. The smart home server 150 identifies the home ID included in the home visit request message received from the first terminal 130 and looks up the gateway 170 and at least one second terminal 175-1 included in the household corresponding to the home ID in step 1121. The smart home server 150 pages each of the gateway 170 and at least one second terminal 175-1 included in the household corresponding to the home ID. For example, the smart home server 150 transmits a home call message including identification information of the first terminal 130 to the gateway 170 in step 1123. The gateway 170 transmits an IP request message including at least the Nat ID among the identification information of the first terminal 130 to the NAT server 190 in step 1125. Then, the NAT server 190 identifies the Nat ID of the first terminal 130 included in the IP request message and transmits an IP response message including a public IP of the first terminal 130 to the gateway 170 in step 1127. The gateway 170 may start a streaming service for at least one of an image and a voice with the first terminal 130 by using the public IP of the first terminal 130 included in the IP response message received from the NAT server 190 in step 1129.

The smart home server 150 transmits a home call message including the identification information of the first terminal 130 to the second terminal 175-1 in step 1131. The second terminal 175-1 transmits an IP request message including at least the Nat ID among the identification information of the first terminal 130 to the NAT server 190 in step 1133. Then, the NAT server 190 identifies the Nat ID of the first terminal 130 included in the IP request message and transmits an IP response message including the public IP of the first terminal 130 to the second terminal 175-1 in step 1135. The second terminal 175-1 may start a streaming service for at least one of an image and a voice with the first terminal 130 by using the public IP of the first terminal 130 included in the IP response message received from the NAT server 190 in step 1137.

Figure 12A:
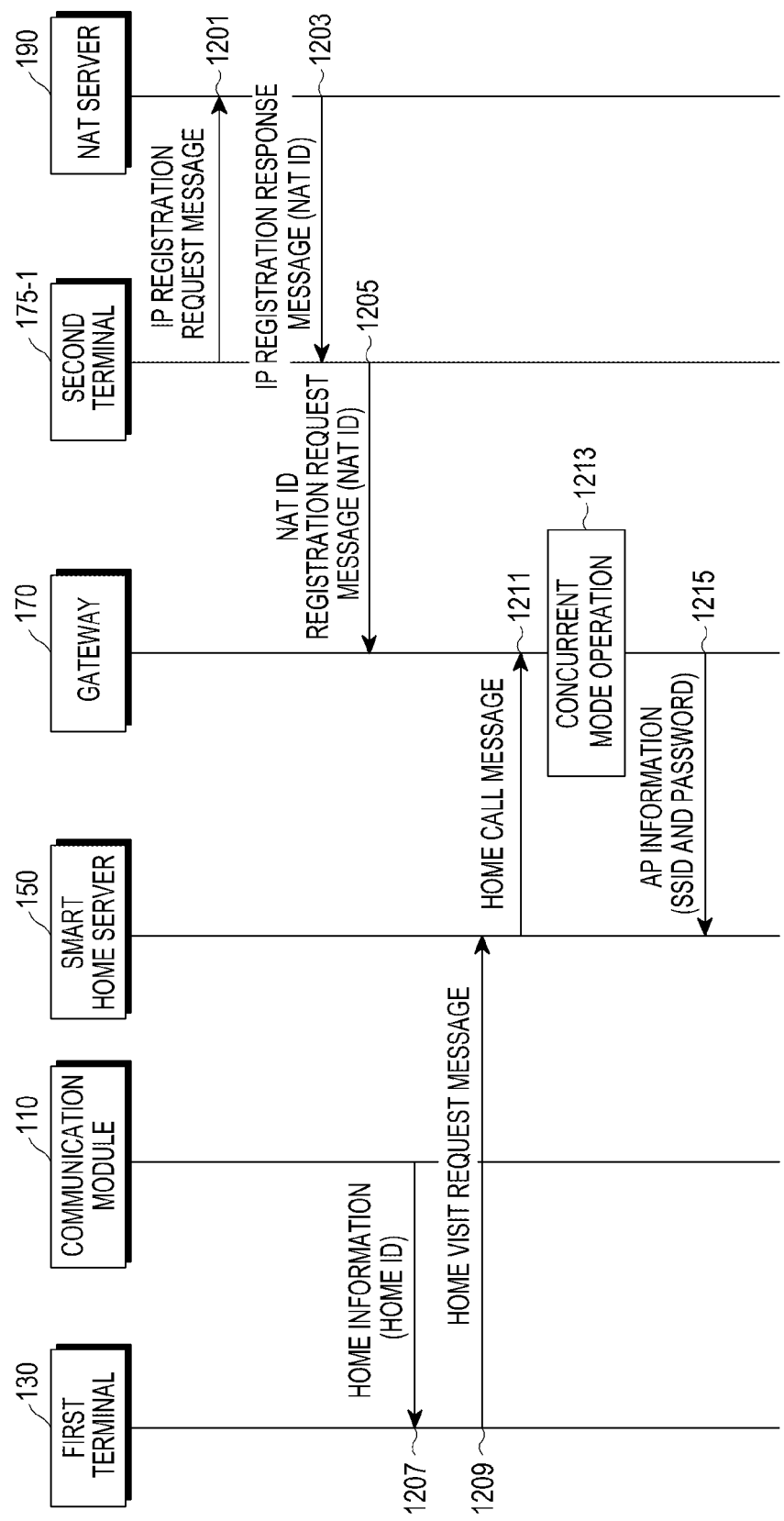
FIGS. 12A and 12B are flow diagrams illustrating an example of controlling a visitor's call by applying an NAT technology in the home network according to a second example embodiment of the present disclosure.
Figure 12B:
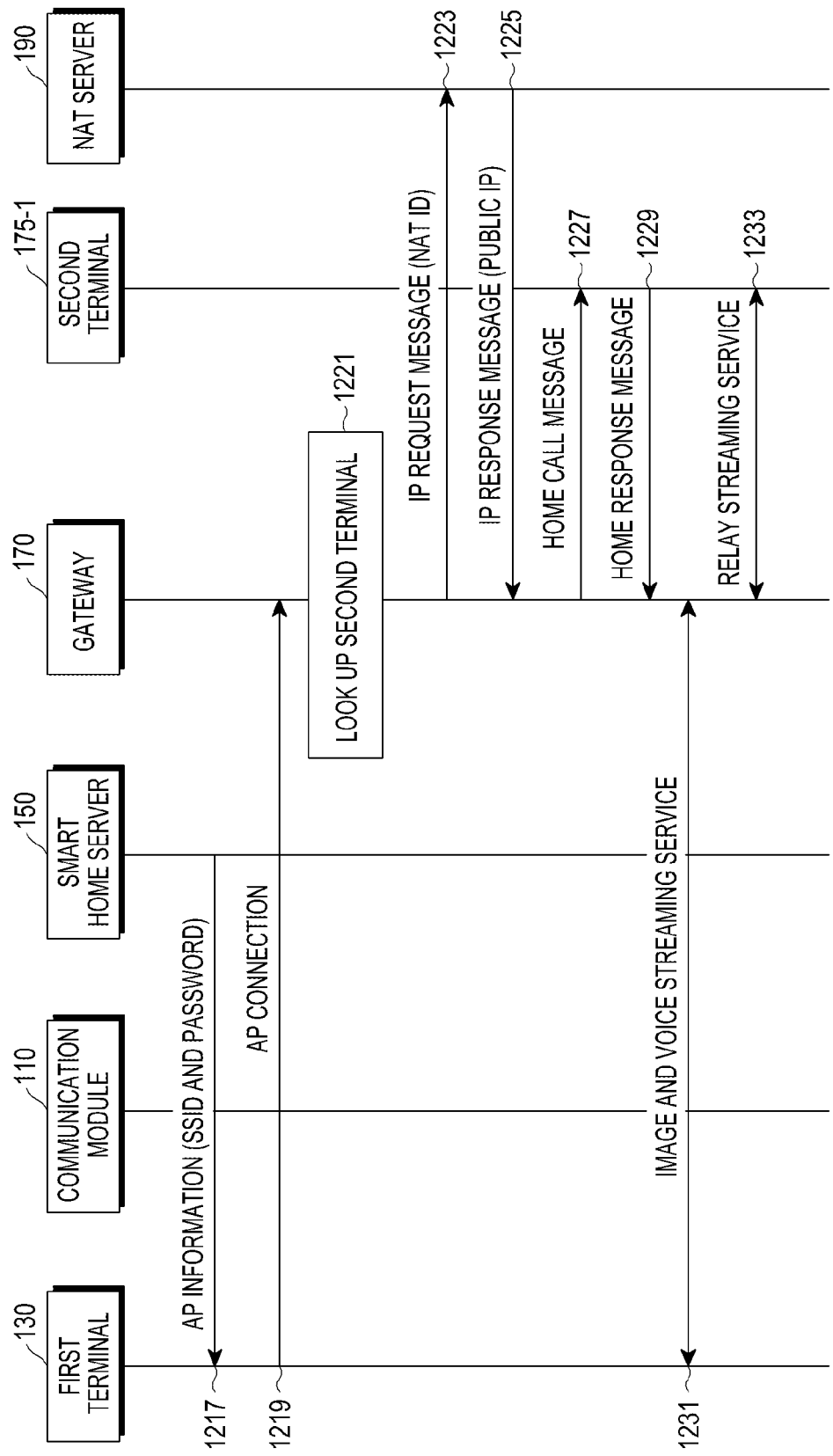

FIGS. 12A and 12B are flow diagrams illustrating an example in which the home network controls a visitor's call by applying the NAT technology according to a second example embodiment of the present disclosure. The second example embodiment of the present disclosure relates to a direct connection between the first terminal 130 and the gateway 170 operating in a concurrent mode. However, the communication module 110 cannot perform direct communication with the gateway 170, so that the first terminal 130 receives AP information for performing an AP mode through the smart home server 150.

Referring to FIGS. 12A and 12B, the second terminal 175-1 located outside the home transmits an IP registration request message to the NAT server 190 in step 1201. The IP registration request message may include an IP address of the second terminal 175-1. Then, the NAT server 190 receives the IP registration request message from the second terminal 175-1, registers the IP address included in the IP registration request message, inserts a Nat ID of the IP address of the second terminal 175-1 into an IP registration response message, and transmits the IP registration response message to the second terminal 175-1 in step 1203. Further, the second terminal 175-1 transmits a Nat ID registration request message including a home ID of the second terminal 175-1 and the Nat ID to the gateway 170 in step 1205. The gateway 170 may store the Nat ID of the second terminal 175-1 in a management list of the household.

Thereafter, when the first terminal 130 is located within a predetermined distance for communication with the communication module 110, the first terminal 130 receives home information (for example, home ID) from the communication module 110 in step 1207. Further, the first terminal 130 transmits a home visit request message including the home ID and identification information of the first terminal 130 to the smart home server 150 in step 1209. The smart home server 150 identifies the home ID included in the home visit request message and transmits a home call message including the identification information of the first terminal 130 to the gateway 170 existing in the household corresponding to the home ID in step 1211.

The second terminal 175-1 starts the operation in the concurrent mode in step 1213, and transmits AP information (for example, service set identifier (SSID) and password) for performing the AP mode in the concurrent mode to the smart home server 150 in step 1215, and the AP information is transmitted to the first terminal 130 through the smart home server 150 in step 1217. The first terminal 130 identifies the received AP information, connects to the gateway 170, and makes a request for communication in step 1219.

When the first terminal 130 is connected to the gateway 170, the gateway 170 looks up at least one second terminal 175-1 to communicate with the first terminal 130 based on the managed management list in step 1221. In order to make a request for an IP for communication with the first terminal 130, the gateway 170 transmits an IP request message including a Nat ID of the first terminal 130 to the NAT server 190 in step 1223. Then, the NAT server 190 identifies the Nat ID of the first terminal 130 included in the IP request message and transmits an IP response message including a public IP of the first terminal 130 to the gateway 170 in step 1225.

The gateway 170 transmits a home call message to the second terminal 175-1 found in the management in step 1227, and transmits a home response message including the existence or non-existence of a response to the home call to the gateway 170 in step 1229. When the home response message includes call acceptance information, the gateway 170 starts a streaming service for at least one of an image and a voice with the first terminal 130 in step 1231. Further, the gateway 170 relays the streaming service with the first terminal 130 to the second terminal 175-1 in step 1223.

Figure 13A:
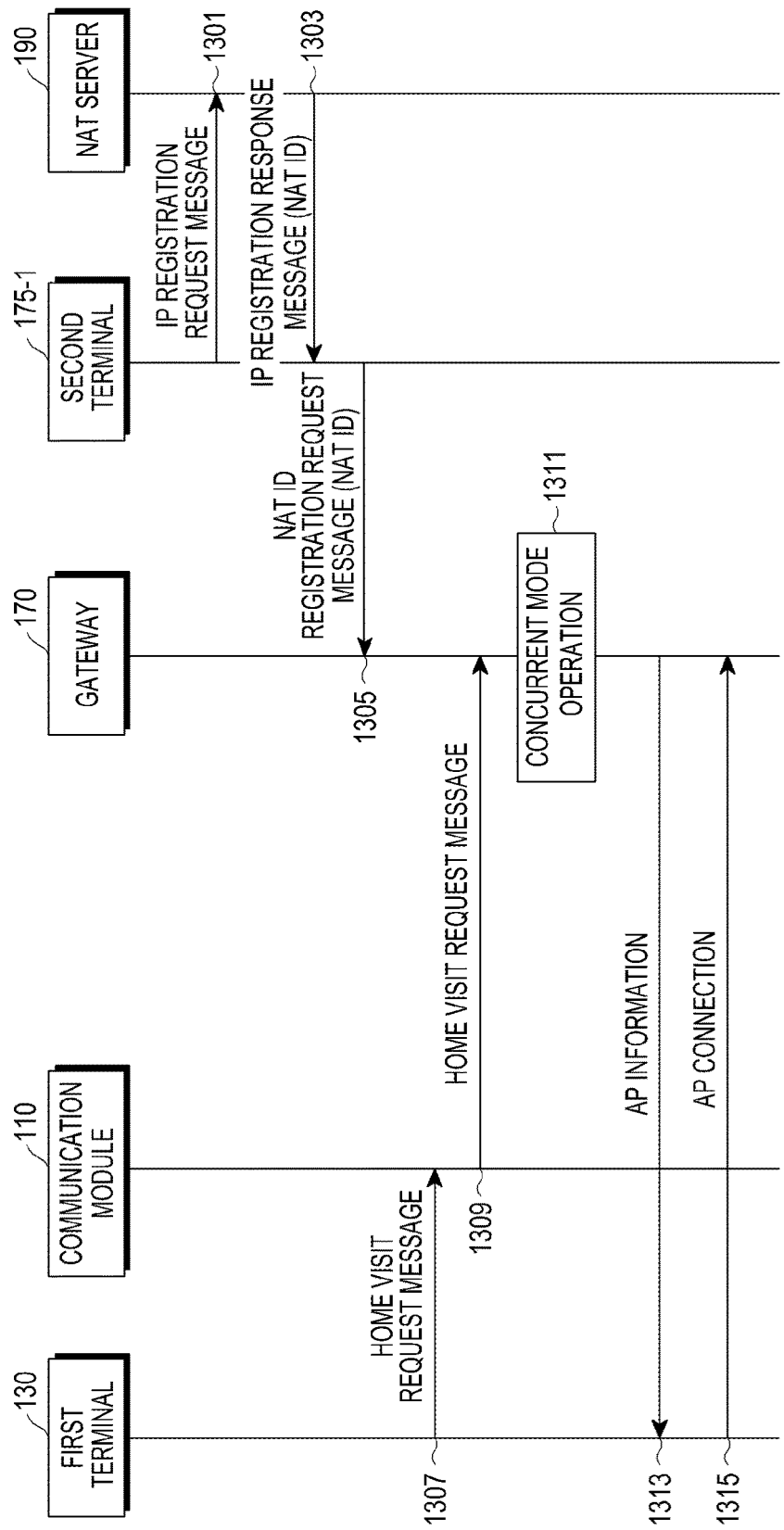
FIGS. 13A and 13B are flow diagrams illustrating an example of controlling a visitor's call by applying an NAT technology in the home network according to a third example embodiment of the present disclosure.
Figure 13B:
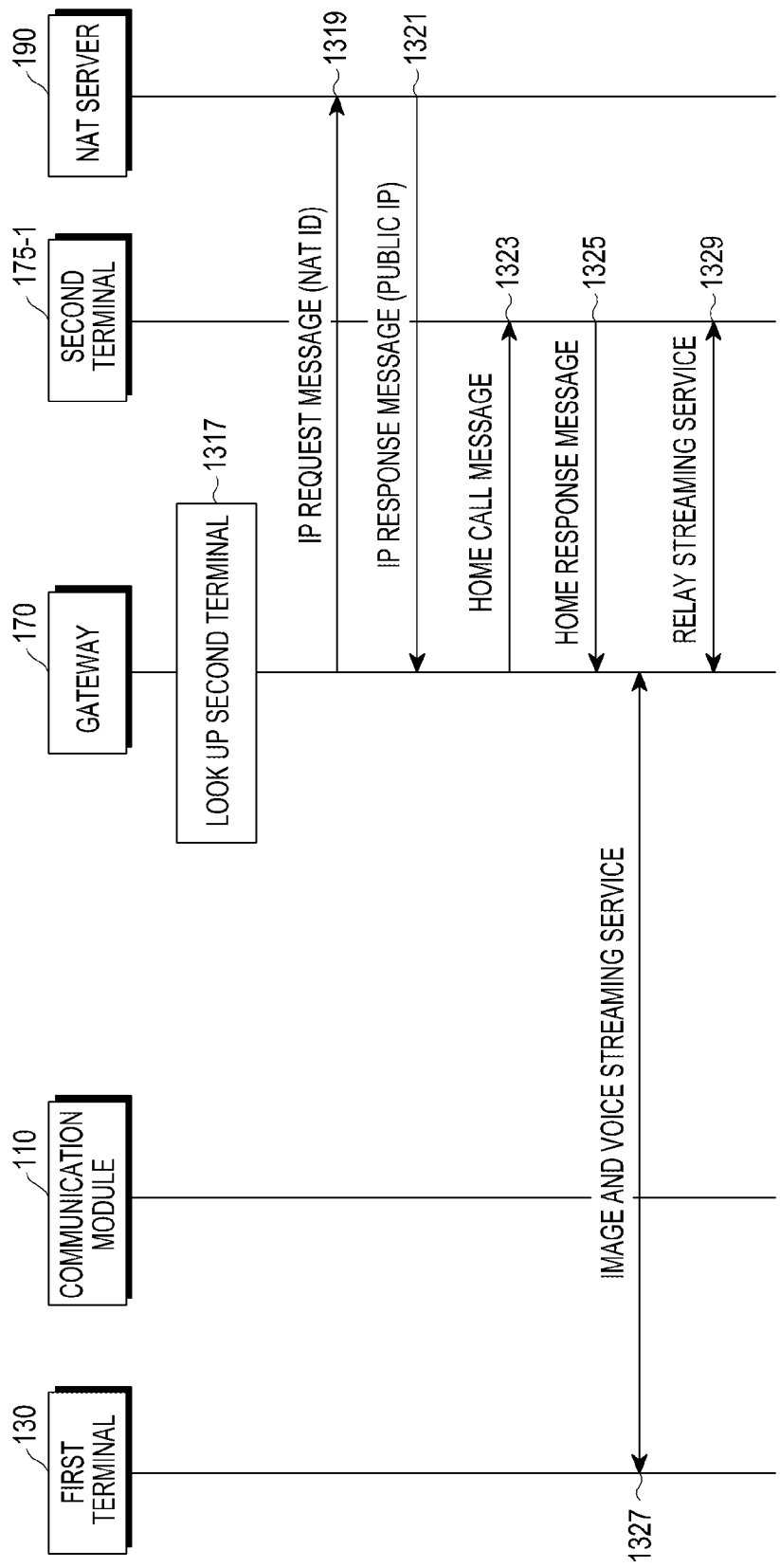

FIGS. 13A and 13B are flow diagrams illustrating an example method of controlling a visitor's call by applying the NAT technology in the home network according to a third example embodiment of the present disclosure. The third example embodiment relates to a direct connection between the first terminal 130 and the gateway 170 operating in the concurrent mode when the first terminal 130 and the gateway 170 perform BLE communication. In the third example embodiment of the present disclosure, the communication module 110 is configured as a device that supports BLE.

Referring to FIGS. 13A and 13B, the second terminal 175-1 existing outside the home transmits an IP registration request message to the NAT server 190 in step 1301. The IP registration request message may include an IP address of the second terminal 175-1. Then, the NAT server 190 receives the IP registration request message from the second terminal 175-1, registers the IP address included in the IP address request message, inserts a Nat ID of the IP address of the second terminal 175-1 into an IP registration response message, and transmits the IP registration response message to the second terminal 175-1 in step 1203. Further, the second terminal 175-1 transmits a Nat ID registration request message including a home ID of the second terminal 175-1 and the Nat ID to the gateway 170 in step 1302. The gateway 170 may store the Nat ID of the second terminal 175-1 in a management list of the household.

Thereafter, the first terminal 130 transmits a home visit request message including the identification information of the first terminal 130 to the gateway 170 through the communication module 110 in steps 1307 and 1309. Further, the gateway 170 starts the operation in the concurrent mode in step 1311 and transmits AP information (for example, SSID and password) for performing the AP mode in the concurrent mode to the first terminal 130 in step 1313. The first terminal 130 identifies the received AP information, connects to the gateway 170, and makes a request for communication in step 1315.

When the first terminal 130 is connected to the gateway 170, the gateway 170 looks up at least one second terminal 175-1 to communicate with the first terminal 130 based on the managed management list in step 1317. In order to make a request for an IP for communication with the first terminal 130, the gateway 170 transmits an IP request message including a Nat ID of the first terminal 130 to the NAT server 190 in step 1319. Then, the NAT server 190 identifies the Nat ID of the first terminal 130 included in the IP request message and transmits an IP response message including a public IP of the first terminal 130 to the gateway 170 in step 1321.

The gateway 170 transmits a home call message to the second terminal 175-1 found in the management in step 1323, and transmits a home response message including the existence or non-existence of a response to the home call to the gateway 170 in step 1325. When the home response message includes call acceptance information, the gateway 170 starts a streaming service for at least one of an image and a voice with the first terminal 130 in step 1327. Further, the gateway 170 relays the streaming service with the first terminal 130 to the second terminal 175-1 in step 1329.

When the home visit request starts, the streaming service can be performed between the first terminal 130 and at least one second terminal 175-1, . . . , and 175-n through BLE communication without relevant operation between the smart home server 150 and the gateway 170 in the method of controlling the visitor's call according to the third example embodiment of the present disclosure.

The streaming service described in FIGS. 11A to 13B may be provided to the user of the terminal through, for example, a browser or an app through a web real time communication (RTC) technology. Hereinafter, a method of controlling a visitor's call by the first terminal 130 through a browser or an app in the home network system is described with reference to FIGS. 14 and 15.

Figure 14:
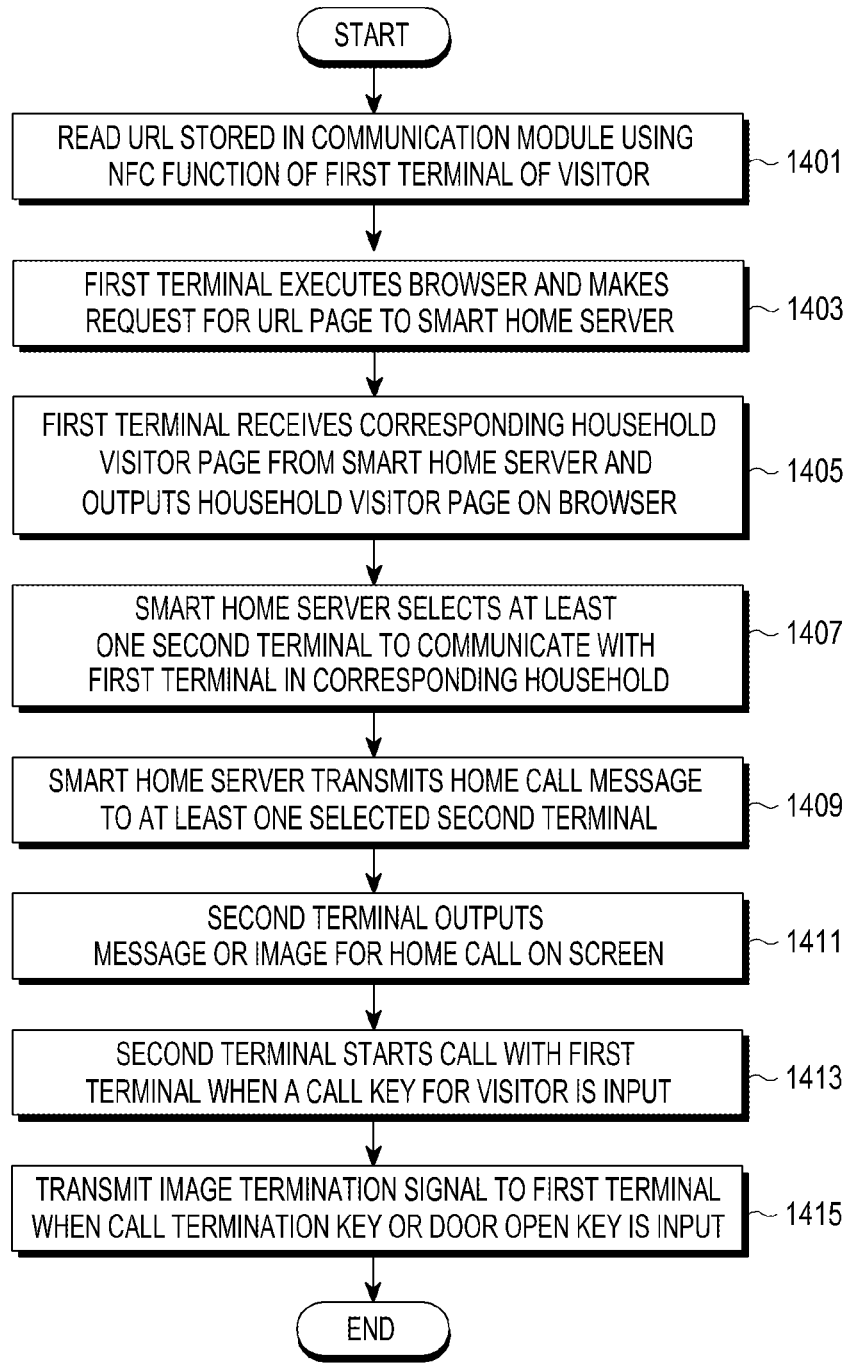
FIG. 14 is a flowchart illustrating an example of controlling a visitor's call by the first terminal through a browser in the home network system according to an example embodiment of the present disclosure.

FIG. 14 is a flowchart illustrating an example of controlling a visitor's call by the first terminal 130 through the browser in the home network system according to an example embodiment of the present disclosure. FIG. 14 describes a case where home information corresponds to a URL as an example.

Referring to FIG. 14, the first terminal 130 of the visitor reads a URL stored in the communication module 110 based on an NFC function in step 1401. The first terminal 130 executes a browser and makes a request for a URL page to the smart home server 150 in step 1403. The first terminal 130 receives a corresponding household visitor page from the smart home server 150 and outputs the received household visitor page on the browser in step 1405. The smart home server 150 selects at least one second terminal to communicate with the first terminal 130 in the corresponding household in step 1407. The at least one second terminal may include the gateway 170. The smart home server 150 transmits a home call message to at least one selected second terminal in step 1409. The second terminal outputs a message or an image of the home call on the screen in step 1411. When a call key is input, the second terminal starts a call with the first terminal 130 in step 1413. When a call termination key or a door open key is input, the second terminal transmits an image termination signal to the first terminal 110 in step 1415. For example, when the call key is input in the second terminal, the smart home server 150 may terminate a home call message of another second terminal.

Figure 15:
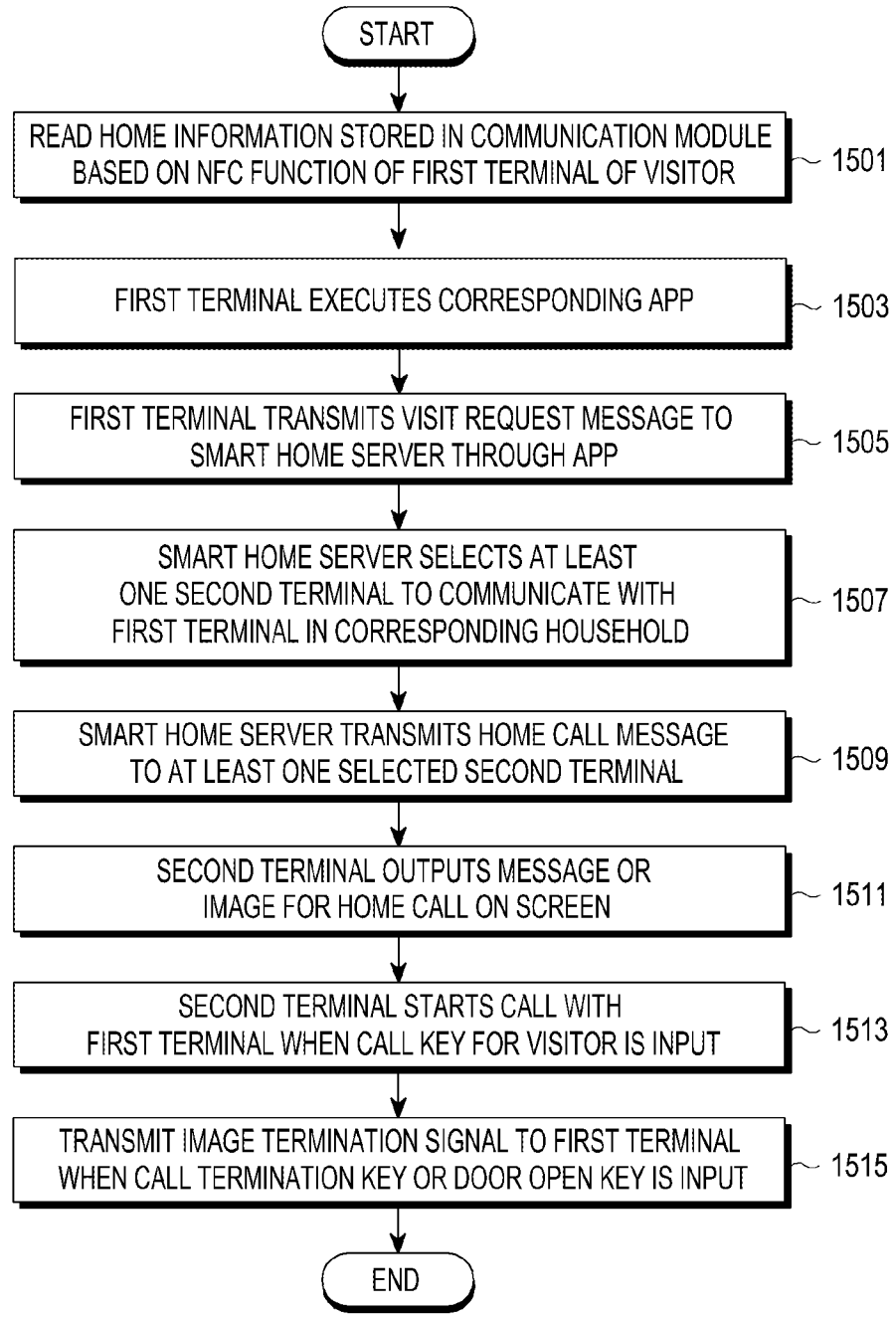
FIG. 15 is a flowchart illustrating an example of controlling a visitor's call by the first terminal through an app in the home network system according to an example embodiment of the present disclosure.

FIG. 15 is a flowchart illustrating an example for controlling a visitor's call by the first terminal 130 through an app in the home network system according to an example embodiment of the present disclosure.

Referring to FIG. 15, the first terminal 130 of the visitor reads home information stored in the communication module 110 based on an NFC function in step 1501, and automatically executes a visit-related app in step 1503. The first terminal 130 transmits a home visit request message to the smart home server 150 through the app in step 1505. The smart home server 150 selects at least one second terminal to communicate with the first terminal 130 in the corresponding household in step 1507. The at least one second terminal may include the gateway 170. The smart home server 150 transmits a home call message to at least one selected second terminal in step 1509. The second terminal outputs a message or an image of the home call on the screen in step 1511. When a call key is input, the second terminal starts a call with the first terminal 130 in step 1513. When a call termination key or a door open key is input, the second terminal transmits an image termination signal to the first terminal 110 in step 1515. For example, when the call key is input in the second terminal, the smart home server 150 may terminate a home call message of another second terminal.

Hereinafter, example embodiments to which the method of controlling the visitor's call in the home network system according to the various example embodiments of the present disclosure will be described with reference to FIGS. 16 and 17.

Figure 16:
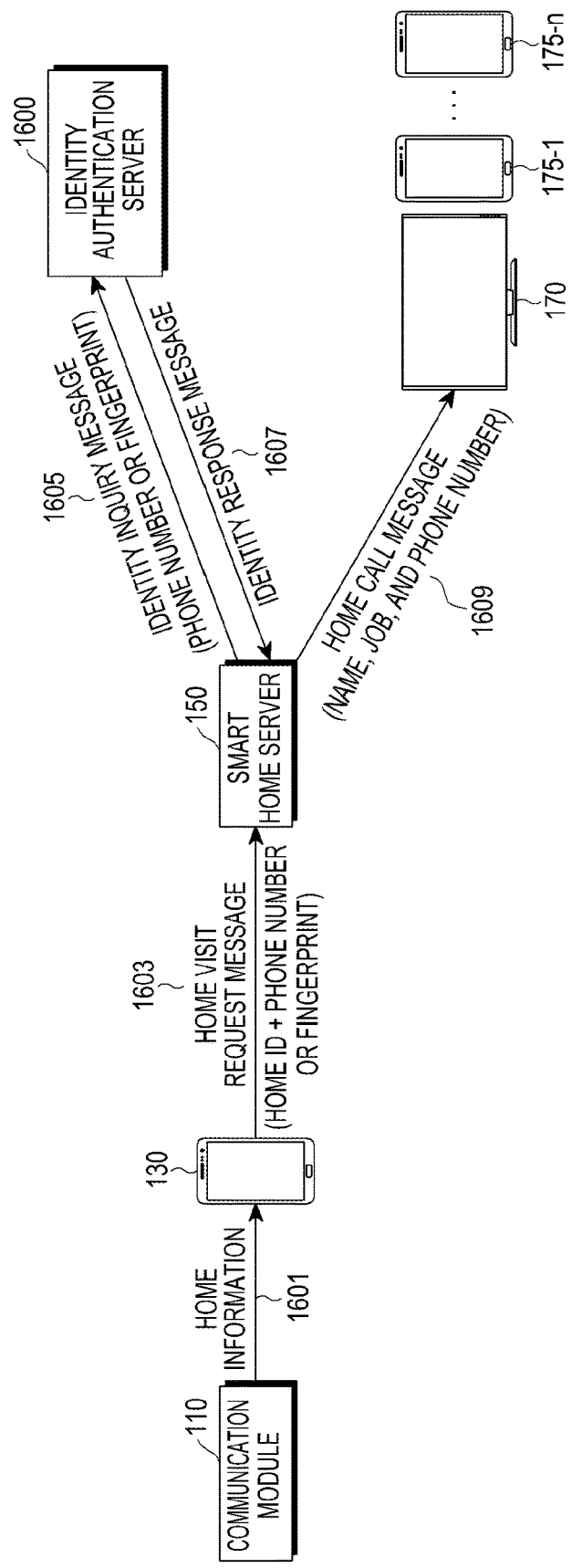
FIG. 16 is a diagram illustrating an example of a case where a method of controlling a visitor's call is applied to an identity authentication server according to an example embodiment of the present disclosure.

FIG. 16 is a diagram illustrating an example of a case where the method of controlling the visitor's call is applied to an identity authentication server according to an example embodiment of the present disclosure.

Referring to FIG. 16, when the first terminal 130 reads the NFC module or the QR code of the communication module 110 within a predetermined distance for communication with the communication module 110, the communication module 110 transmits pre-stored home information to the first terminal 130 in step 1601. The first terminal 130 transmits a home visit request message including home information (for example, home ID) and identification information for identifying the terminal to the smart home server 150 in step 1603. Then, the smart home server 150 may transmit an identity inquiry message including the identification information of the first terminal 130 to the identity authentication server 1600 in order to confirm the visitor's identity in step 1605. The smart home server 150 receives an identity response message including identity information (for example, name, job, and phone number) of the first terminal 130 from the identity authentication server 1600 in step 1607. Accordingly, the smart home server 150 may transmit a home call message including the identity information to the gateway 170 of the household corresponding to the home information included in the home visit request message and at least one of the second terminals 175-1, . . . , and 175-n in step 1609. The second terminal having received the home call message may output the identity information of the user of the first terminal 130 on the screen.

Figure 17:
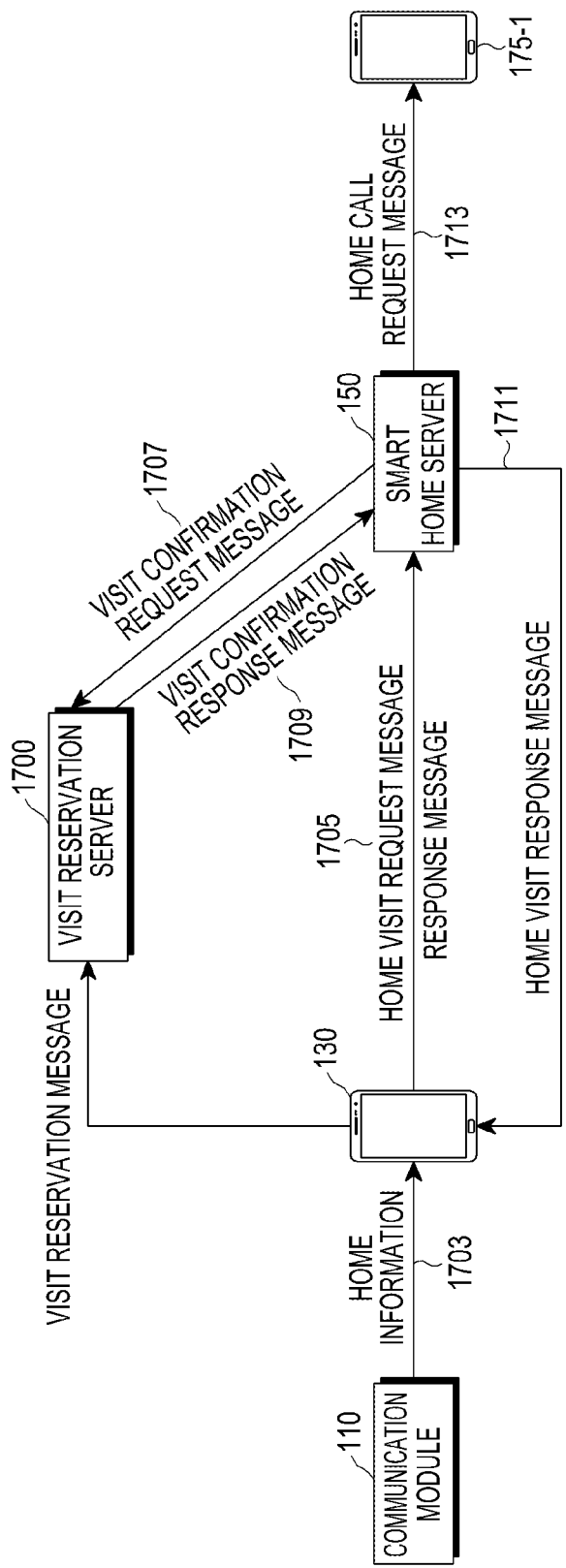
FIG. 17 is a diagram illustrating an example of a case where a method of controlling a visitor's call is applied to a company visit system according to an example embodiment of the present disclosure.

FIG. 17 is a diagram illustrating an example of a case where the method of controlling the visitor's call is applied to a company visit system according to an example embodiment of the present disclosure.

Referring to FIG. 17, the first terminal 130 of the visitor or a staff transmits a visit reservation message to a visit reservation server 1700 to make an appointment for a visit. The visit reservation message may include at least one of a phone number of the visitor, a phone number of the staff in charge, and a conference room. Thereafter, when the first terminal arrives at the company and reads the NFC module or the QR code of the communication module 110 within a predetermined distance for communication with the communication module 110, the communication module 110 transmits pre-stored home information (for example, company ID) to the first terminal 130 in step 1703. Further, the first terminal 130 transits a home visit request message including home information (for example, company ID) and identification information to the smart home server 150 in step 1705. Then, the smart home server 150 transmits a visit confirmation request message including the identification information of the first terminal 130 to the visit reservation server 1700 in step 1707. The visit reservation server 1700 identifies whether the visit reservation is permitted with respect to the identification information of the first terminal 130 in response to the visit confirmation request message and, when the visit reservation is permitted, transmits a visit confirmation response message including at least one of the phone number of the staff in charge and the conference room to the smart home server 150 in step 1709.

Further, the smart home server 150 transmits a home visit response message including at least one of the phone number of the staff in charge and the conference room included in the visit confirmation response message to the first terminal 130 in step 1711 or transmits a home call request message that informs of arrival of the visitor to the second terminal 175-1 of the corresponding staff in step 1713.

According to example embodiments of the present disclosure, it is possible to efficiently identify information on the visitor through a link with the identity authentication server or the visit reservation server separated from the smart home server and to directly perform communication between the first terminal 130 and at least one second terminal.

Although various example embodiments are described in the detailed description of the present disclosure, the present disclosure may be modified in various forms without departing from the scope of the present disclosure. Thus, the scope of the present disclosure shall not be determined merely based on the described example embodiments and rather determined based on the accompanying claims and the equivalents thereto.

What is claimed is:

1. A method for processing a call to a first terminal requesting a visit to a home, by a second terminal from among a plurality of second terminals registered in a smart home server, in a home network system, the method comprising:
    transmitting, to the smart home server, a home information request message for requesting home information;
    receiving, from the smart home server, a home information response message including the home information for the home where the second terminal is registered;
    storing the home information included in the home information response message in a communication module; and
    performing communication with the first terminal based on the home information,
    wherein the home information includes a home identification for identifying the home where the plurality of second terminal are registered.

2. The method of claim 1, wherein the performing communication with the first terminal based on the home information comprises:
    receiving a call message from the smart home server or a gateway present inside the home when the first terminal is located within a predetermined distance in which communication with the communication module storing the home information is possible;
    transmitting a call response message including information indicating whether to accept communication with a first terminal; and
    performing communication with the first terminal, if the information indicates to accept communication with the first terminal.

3. The method of claim 2, wherein the call message includes first terminal identification information for identifying the first terminal.

4. The method of claim 1, wherein the communication module includes at least one of a near field communication (NFC) module, a quick response (QR) code, and bluetooth low energy (BLE) patch.

5. The method of claim 2, wherein the communication module is installed in outside the home, and
wherein the first terminal receives the home information from the communication module when the first terminal is located within the predetermined distance.

6. A method for processing a call to a plurality of second terminals registered in a smart home server from a first terminal requesting a visit to a home, by the smart home server in a home network system, the method comprising:
receiving, from a second terminal from among the plurality of second terminals, a home information request message for requesting home information;
generating the home information for the home where the second terminal is registered;
transmitting, to the second terminal, a home information response message including the home information; and
processing the call for communication between the first terminal and at least one second terminal from among the plurality of second terminals based on the home information,
wherein the home information includes a home identification for identifying the home where the plurality of second terminal are registered.

7. The method of claim 6, processing the call for communication between the first terminal and at least one second terminal from among the plurality of second terminals based on the home information comprises:
receiving, from the first terminal, a visit request message including the home information and first terminal identification information for identifying the first terminal;
determining the at least one second terminal from among the plurality of second terminals registered in the home corresponding to the home information, to which to transmit a call message; and
transmitting, to the determined at least one second terminal, the call message.

8. The method of claim 6, wherein the home information transmitted to the second terminal is stored in a communication module.

9. The method of claim 8, wherein the communication module includes at least one of a near field communication (NFC) module, a quick response (QR) code, and bluetooth low energy (BLE) patch.

10. The method of claim 8, wherein the communication module is installed in outside the home, and
wherein the first terminal receives the home information from the communication module when the first terminal is located within a predetermined distance in which communication with the communication module storing the home information is possible.

11. A second terminal for processing a call to a first terminal requesting a visit to a home in a home network system, wherein the second terminal is one from among a plurality of second terminals registered in a smart home server, the second terminal comprising:
a transceiver; and
a controller configured to:
control to transmit, to the smart home server, a home information request message for requesting home information,
control to receive, from the smart home server, a home information response message including the home information for the home where the second terminal is registered,
store the home information included in the home information response message in a communication module, and
perform communication with the first terminal based on the home information, wherein the home information includes a home identification for identifying the home where the plurality of second terminal are registered.

12. The second terminal of claim 11, wherein the controller is configured to:
control to receive a call message from the smart home server or a gateway present inside the home when the first terminal is located within a predetermined distance in which communication with the communication module storing the home information is possible,
control to transmit a call response message including information indicating whether to accept communication with a first terminal, and
perform communication with the first terminal, if the information indicates to accept communication with the first terminal.

13. The second terminal of claim 12, wherein the call message includes first terminal identification information for identifying the first terminal.

14. The second terminal of claim 11, wherein the communication module includes at least one of a near field communication (NFC) module, a quick response (QR) code, and bluetooth low energy (BLE) patch.

15. The second terminal of claim 12, wherein the communication module is installed in outside the home, and
wherein the first terminal receives the home information from the communication module when the first terminal is located within the predetermined distance.

16. A smart home server for processing a call to a plurality of second terminals registered in the smart home server from a first terminal requesting a visit to a home in a home network system, the smart home server comprising:
a transceiver; and
a controller configured to:
control to receive, from a second terminal from among the plurality of second terminals, a home information request message for requesting home information,
generate the home information for the home where the second terminal is registered,
control to transmit, to the second terminal, a home information response message including the home information, and
processing the call for communication between the first terminal and at least one second terminal from among the plurality of second terminals based on the home information,
wherein the home information includes a home identification for identifying the home where the plurality of second terminal are registered.

17. The smart home server of claim 16, wherein the controller is configured to:
control to receive, from the first terminal, a visit request message including the home information and first terminal identification information for identifying the first terminal,
determine the at least one second terminal from among the plurality of second terminals registered in the home corresponding to the home information, to which to transmit a call message, and
control to transmit, to the determined at least one second terminal, the call message.

18. The smart home server of claim 16, wherein the home information transmitted to the second terminal is stored in a communication module.

19. The smart home server of claim 18, wherein the communication module includes at least one of a near field communication (NFC) module, a quick response (QR) code, and bluetooth low energy (BLE) patch.

20. The smart home server of claim 18, wherein the communication module is installed in outside the home, and
wherein the first terminal receives the home information from the communication module when the first terminal is located within a predetermined distance in which communication with the communication module storing the home information is possible.

* * * * *